US011579611B1

(12) United States Patent
Lopez et al.

(10) Patent No.: US 11,579,611 B1
(45) Date of Patent: Feb. 14, 2023

(54) PREDICTING LOCALIZED POPULATION DENSITIES FOR GENERATING FLIGHT ROUTES

(71) Applicant: Amazon Technologies, Inc., Seattle, WA (US)

(72) Inventors: Javier Alonso Lopez, Edmonds, WA (US); Kenny Xie, Seattle, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 16/834,786

(22) Filed: Mar. 30, 2020

(51) Int. Cl.
| | | |
|---|---|---|
| *G05D 1/00* | (2006.01) |
| *G08G 5/00* | (2006.01) |
| *G06T 7/11* | (2017.01) |
| *B64D 47/08* | (2006.01) |
| *B64C 39/02* | (2006.01) |
| *G05D 1/10* | (2006.01) |

(52) U.S. Cl.
CPC ......... *G05D 1/0094* (2013.01); *B64C 39/024* (2013.01); *B64D 47/08* (2013.01); *G05D 1/101* (2013.01); *G06T 7/11* (2017.01); *G08G 5/006* (2013.01); *G08G 5/0034* (2013.01); *G08G 5/0069* (2013.01); *B64C 2201/127* (2013.01); *G06T 2207/10032* (2013.01); *G06T 2207/30181* (2013.01)

(58) Field of Classification Search
CPC .................................................. G05D 1/0094
See application file for complete search history.

(56) References Cited

U.S. PATENT DOCUMENTS

| | | | |
|---|---|---|---|
| 9,262,929 B1 * | 2/2016 | Roy ..................... | G08G 5/0034 |
| 9,518,821 B2 | 12/2016 | Malay | |
| 9,542,849 B1 * | 1/2017 | Bertram ............... | G08G 5/0034 |
| 9,592,912 B1 * | 3/2017 | Michini ............... | B64C 39/024 |

(Continued)

FOREIGN PATENT DOCUMENTS

| | | | | |
|---|---|---|---|---|
| CN | 108594858 B | 10/2020 | | |
| EP | 3251108 A1 * | 12/2017 | ............. | G05D 1/102 |

(Continued)

OTHER PUBLICATIONS

Dobson, James, E., LandScan: A Global Population Database for Estimating Populations at Risk, Photogrammetric Engineering and Remote Sensing · Jul. 2000 (https://www.researchgate.net/profile/Jerome-Dobson/publication/267450852_LandScan_A_Global_Population_Database_for_Estimating_Populations_at_Risk/lin.*

(Continued)

*Primary Examiner* — Jean Paul Cass
(74) *Attorney, Agent, or Firm* — Athorus, PLLC

(57) ABSTRACT

A population density map of a region is generated by dividing the region into cells and allocating a population of the region only to the cells that are accessible to people, or are believed to be populated. Each of the cells is classified based on one or more ground features of the cells, and an adjustment factor for each of the cells is determined based at least in part on the classifications. Equal shares of the population of the region are allocated to each of the cells that is accessible or populated, and the equal shares are multiplied by the adjustment factors determined for the respective ones of the cells to calculate a population for each of such cells.

19 Claims, 18 Drawing Sheets

GEOGRAPHIC AREA WITH POPULATION P AT A SELECTED TIME

(56) References Cited

U.S. PATENT DOCUMENTS

| | | | |
|---|---|---|---|
| 9,594,372 B1* | 3/2017 | Sills | A61H 3/06 |
| 9,773,418 B1* | 9/2017 | Smith | G08G 5/0043 |
| 9,817,396 B1* | 11/2017 | Takayama | G08G 5/0013 |
| 9,849,981 B1* | 12/2017 | Burgess | B64D 1/22 |
| 9,953,540 B2 | 4/2018 | MacFarlane et al. | |
| 10,102,758 B1 | 10/2018 | Beaurepaire et al. | |
| 11,094,202 B2 | 8/2021 | Gong et al. | |
| 2002/0077876 A1 | 6/2002 | O'Meara et al. | |
| 2009/0210109 A1 | 8/2009 | Ravenscroft | |
| 2012/0158280 A1 | 6/2012 | Ravenscroft | |
| 2014/0018979 A1 | 1/2014 | Goossen et al. | |
| 2014/0188748 A1 | 7/2014 | Cavoue et al. | |
| 2014/0330741 A1 | 11/2014 | Bialynicka-Birula et al. | |
| 2015/0148988 A1* | 5/2015 | Fleck | B64D 1/14 701/2 |
| 2015/0153740 A1 | 6/2015 | Ben-Shachar et al. | |
| 2016/0050840 A1* | 2/2016 | Sauder | G05D 1/0094 701/3 |
| 2016/0202074 A1 | 7/2016 | Woodard et al. | |
| 2017/0162059 A1 | 6/2017 | Jarrell | |
| 2017/0178352 A1* | 6/2017 | Harmsen | G06V 10/42 |
| 2018/0025649 A1* | 1/2018 | Contreras | G05D 1/0274 701/3 |
| 2018/0068567 A1 | 3/2018 | Gong et al. | |
| 2018/0156616 A1* | 6/2018 | Bennett | G01S 19/42 |
| 2019/0019423 A1 | 1/2019 | Choi et al. | |
| 2019/0287307 A1* | 9/2019 | Rogers | G06T 15/08 |
| 2020/0258400 A1 | 8/2020 | Yuan et al. | |
| 2020/0364456 A1* | 11/2020 | Tran | A01G 22/00 |
| 2020/0379118 A1* | 12/2020 | Reid | G01S 19/10 |
| 2021/0089055 A1 | 3/2021 | Tran | |
| 2021/0163068 A1 | 6/2021 | Zhu et al. | |
| 2021/0165426 A1 | 6/2021 | White | |
| 2021/0173414 A1 | 6/2021 | Starr et al. | |
| 2021/0173415 A1* | 6/2021 | Cajias | G06V 20/64 |
| 2021/0225176 A1* | 7/2021 | Kusumi | G08G 5/0026 |

FOREIGN PATENT DOCUMENTS

| | | | |
|---|---|---|---|
| EP | 3251108 A1 | 12/2017 | |
| EP | 3792896 A1 * | 3/2021 | G08G 5/0039 |
| WO | 2016122780 A1 | 8/2016 | |
| WO | WO-2019099912 A1 * | 5/2019 | G06F 3/011 |
| WO | 2019133048 A1 | 7/2019 | |
| WO | 2019133049 A1 | 7/2019 | |

OTHER PUBLICATIONS

Lui, Yecheng et al., A virtual-waypoint based artificial potential field method for UAV path planning, 2016 IEEE Chinese Guidance, Navigation and Control Conference (CGNCC)( https://ieeexplore.ieee.org/abstract/document/7828913) (hereinafter "Yecheng").*

Dobson, James, E. et al., "LandScan: A Global Population Database for Estimating Populations at Risk," Photogrammetric Engineering and Remote Sensing, vol. 66, No. 7, American Society for Photogrammetry and Remote Sensing, Jul. 2000, URL: https://www.researchgate.net/publication/267450852_LandScan_A_Global_Population_Database_for_Estimating_Populations_at_Risk, pp. 849-857, 10 pages.

Ibrahim, M., and M. Youssef, (Jun. 1, 2011), "A Hidden Markov Model for Localization Using Low-End GSM Cell Phones", 2011 IEEE International Conference on Communications Proceedings, IEEE Communications Society, URL: http://www.winlab.rutgers.edu/~mibrahim/papers/cellsense-icc2011.pdf, 5 pages.

* cited by examiner

ASSIGN ADJUSTMENT FACTORS TO
BASE CELLS BASED ON CLASSIFICATION

| DOMINANT FEATURE OF BASE CELL | CLASSIFICATION OF BASE CELL | ADJUSTMENT FACTOR FOR BASE CELL | UNADJUSTED POPULATION OF BASE CELL | ADJUSTED POPULATION OF BASE CELL |
|---|---|---|---|---|
| AGRICULTURE | $L_1$ | $A_1$ | $P/(N-n)$ | $A_1 \cdot P/(N-n)$ |
| RECREATION | $L_2$ | $A_2$ | $P/(N-n)$ | $A_2 \cdot P/(N-n)$ |
| SPARSE RESIDENTIAL COMMERCIAL EDUCATION | $L_3, L_4, L_5$ | $A_3$ | $P/(N-n)$ | $A_3 \cdot P/(N-n)$ |
| DENSE RESIDENTIAL | $L_6$ | $A_4$ | $P/(N-n)$ | $A_4 \cdot P/(N-n)$ |

$$\Sigma = P$$

FIG. 1F

ESTIMATED POPULATION DEVIATIONS IN BASE CELLS AT SELECTED TIME $$P = x \cdot A_{LOW} \cdot \frac{P}{(N-n)} + y \cdot A_{HIGH} \cdot \frac{P}{(N-n)} + 0$$

TOTAL POPULATION | LOW DENSITY BASE CELLS | HIGH DENSITY BASE CELLS | UNPOPULATED BASE CELLS

POPULATION DECREASE IN LOW DENSITY BASE CELLS = $x \cdot \frac{P}{(N-n)} - x \cdot A_{LOW} \cdot \frac{P}{(N-n)}$

ORIGINAL LOW DENSITY POPULATION − ADJUSTED LOW DENSITY POPULATION

POPULATION DECREASE IN HIGH DENSITY BASE CELLS = $y \cdot A_{HIGH} \cdot \frac{P}{(N-n)} - y \cdot \frac{P}{(N-n)}$

ADJUSTED HIGH DENSITY POPULATION − ORIGINAL HIGH DENSITY POPULATION $$A_{LOW} = 1 - \frac{y}{x}(A_{HIGH} - 1) < 1.0$$

$$A_{HIGH} = 1 + \frac{x}{y}(1 - A_{LOW}) > 1.0$$

FIG. 4C

THREE CLASS EXAMPLE

CLASSIFICATIONS $L_{LOW}, L_{MID}, L_{HIGH}$ x LOW DENSITY CELLS y MED DENSITY CELLS z HIGH DENSITY CELLS $$P = x \cdot A_{LOW} \cdot \frac{P}{(N-n)} \quad + \quad y \cdot A_{MED} \cdot \frac{P}{(N-n)} \quad + \quad z \cdot A_{HIGH} \cdot \frac{P}{(N-n)}$$

FOUR CLASS EXAMPLE

CLASSIFICATIONS $L_1, L_2, L_3, L_4$ x DENSITY 1 CELLS y DENSITY 2 CELLS z DENSITY 3 CELLS a DENSITY 4 CELLS $$P = x \cdot A_1 \cdot \frac{P}{(N-n)} + y \cdot A_2 \cdot \frac{P}{(N-n)} + z \cdot A_3 \cdot \frac{P}{(N-n)} + a \cdot A_4 \cdot \frac{P}{(N-n)}$$

PREDICTING LOCALIZED POPULATION DENSITIES FOR GENERATING FLIGHT ROUTES

BACKGROUND

The frequency and number of applications in which aerial vehicles, such as unmanned aerial vehicles (or "UAV") or drones, are used continue to increase over time, even as aerial vehicles are becoming both more capable and more complex, or are shrinking in size. In particular, unmanned aerial vehicles have been used in making deliveries of items from one location to another, responding to critical issues affecting public or private safety, or completing other tasks. Unlike large aerial vehicles such as jumbo jets or propeller planes, which are typically assigned high-altitude flight paths and travel at speeds in the hundreds of miles per hour, some unmanned aerial vehicles are designed to fly at lower speeds and altitudes, or with few limitations on lateral, horizontal or vertical movements.

Where unmanned aerial vehicles engage in airborne operations over or near populated areas, proper considerations must be made to maximize the reliability of a flight plan and to ensure the safety of persons or property on the ground below. In order to determine a safe route or path for an unmanned aerial vehicle, a variety of data sets are typically considered, including locations and altitudes associated with flight restrictions such as no-fly zones, routes or paths being traveled by other aerial vehicles, weather forecasts, or locations of emergency or contingency landing zones, or the like.

On some occasions, primary considerations in selecting routes or paths for aerial vehicles in general, and for unmanned aerial vehicles in particular, are the population densities of the areas on grounds beneath the routes or paths. Such population densities may be used to calculate a safety score, or a reliability score, regarding a mission or a flight over such grounds. Population densities are calculated based on population data obtained from a variety of sources, including local, regional, national or global datasets, which may be determined from censuses or other data sources. Most population data is determined with respect to ground surfaces at levels of granularity on the order of hundreds of meters or more. However, even with such granularity, many population data sets for a given geographic region have limited reliability, particularly in dense urban or suburban areas. Where land uses in a given geographic region are not uniform, and ground surfaces of varying types or classes may be provided alongside one another or within a close range of one another, a population density calculated for the varying ground surfaces within the region may be difficult to calculate with accuracy or may be irrelevant to the actual population densities of such ground surfaces. Likewise, routes or paths that are determined for aerial vehicles based on such population densities may be suboptimal.

BRIEF DESCRIPTION OF THE DRAWINGS

FIGS. 1A through 1H are views of aspects of one system for predicting localized population densities in accordance with embodiments of the present disclosure.

FIGS. 4A through 4C are views of aspects of one system for predicting localized population densities in accordance with embodiments of the present disclosure.

DETAILED DESCRIPTION

Figure 1A:
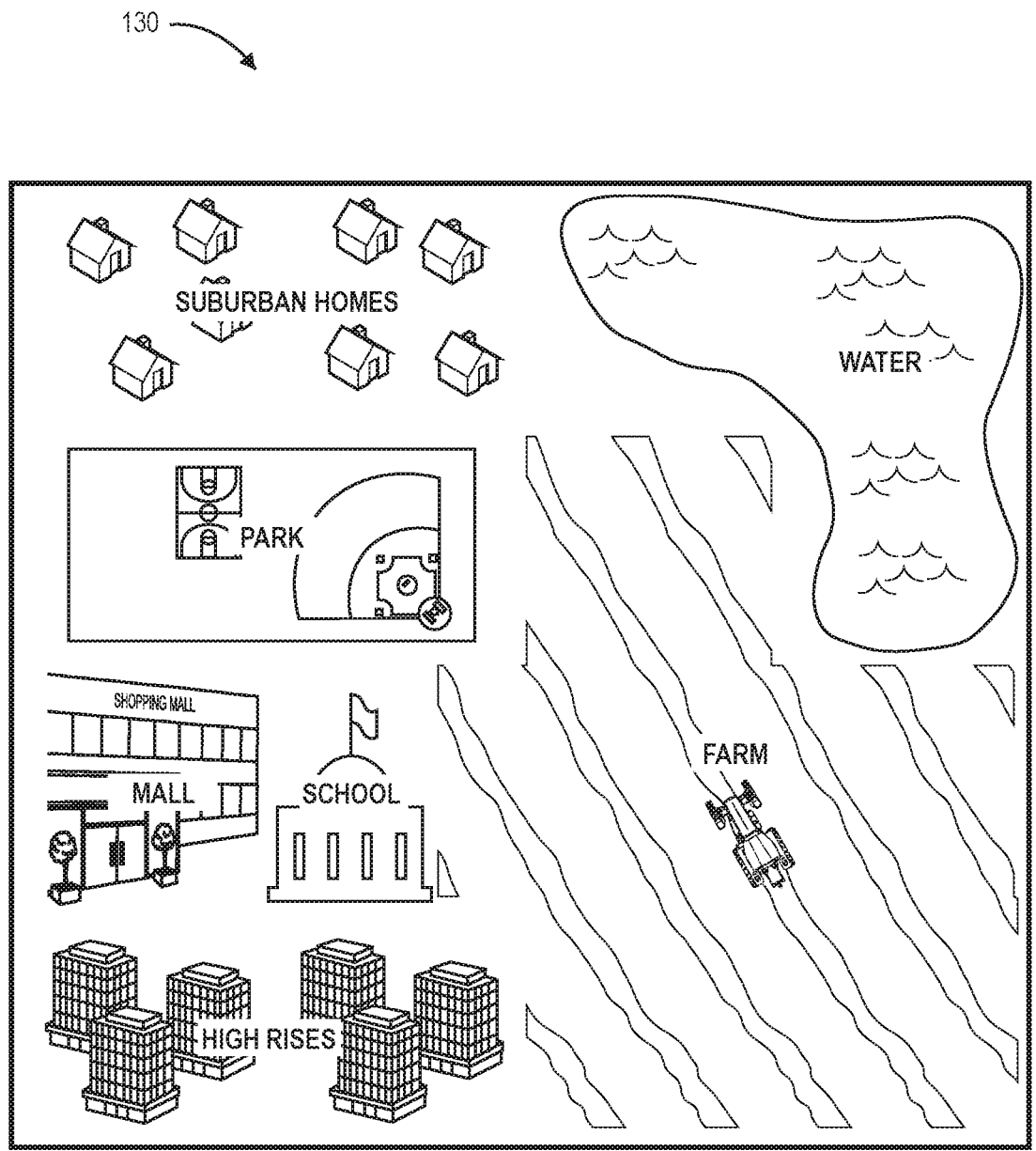

As is set forth in greater detail below, the systems and methods of the present disclosure are directed to selecting flight routes based on localized population densities or other conditions existing on the ground that are determined or predicted at one or more selected times. More specifically, where population data is available for a geographic region at a selected time, e.g., one or more specific days, hours or minutes, or a range of days, hours or minutes. A parent cell may be defined from a map or other representation of the geographic region, and may have any area or size, and any shape (e.g., triangles, rectangles, pentagons, hexagons, octagons, or others). The parent cell may be further subdivided into another set of cells, e.g., a set of base cells, which may also have any shape, including but not limited to the same shape as the parent cell. Ground surfaces of the base cells may be identified and evaluated to determine which of such base cells are inaccessible or unpopulated at the selected time, such as base cells including bodies of water, dense forests, steep hills or mountains, or other impassible surfaces, e.g., snowy, muddy or rocky surfaces. Base cells that are inaccessible or unpopulated at the selected time may be excluded from consideration, and a total population of the parent cell may be allocated in an equal manner, e.g., by dividing the total population by a number of the base cells that are accessible or populated, and allocating this quotient to each of the base cells that are accessible or populated.

Subsequently, an adjustment factor may be calculated for each of such base cells at the selected time based on one or more ground features within such base cells. For example, where a base cell includes residential areas of varying densities, agricultural facilities, educational institutions, hospitals, commercial areas, recreational areas, or the like, an adjustment factor that takes into account the structures, functions or activities that are located or occurring in a given base cell at the selected time may be calculated accordingly. The adjustment factors calculated for each of the base cells may have positive values that are less than one, equal to one, or greater than one, such that when each of the adjustment factors is multiplied by a population of the parent cell that has been allocated to a corresponding base cell, a population of a base cell may be decreased, maintained or increased with respect to the portion of the parent cell that has been allocated to the base cell accordingly, in a manner that conserves the total population of the parent cell. Moreover, where a population of a parent cell, or of one or more base cells of the parent cell, is known or believed to deviate from a predetermined value of population at the selected time, the population of the parent cell, or of the one or more base cells, may be augmented or otherwise modified accordingly, such as by adding to or subtracting from the predetermined value.

After adjusted populations have been calculated for each of the base cells that are determined to be accessible or populated, a population density map may be generated based on such base cells, e.g., by dividing the adjusted populations by areas of the corresponding base cells to determine values of their respective population densities, as well as base cells that are inaccessible or unpopulated, which are presumed to have population densities of zero. In some embodiments, base cells that are determined to have equal or substantially similar population densities following the adjustments may be grouped together into child cells, which may be treated uniformly when generating a population density map from the parent cell. Once a population density map has been generated, the population density map may be used to select a flight route or path over or through the region that considers the population densities of the respective base cells accordingly.

Additionally, where ground truth data (e.g., actual population data) regarding a parent cell or one or more base cells of the parent cell is available, such as based on results of a survey, the ground truth data may be compared to the adjusted population densities calculated for the one or more base cells in order to identify any bias associated with the calculation of the population densities or the generation of the population density map therefrom. Where bias is identified for one or more of the base cells, values of adjustment factors of one or more of the base cells may be modified accordingly, e.g., to minimize the overall errors between the adjusted population densities and the population densities that are determined from the ground truth data.

Referring to FIGS. 1A through 1H, views of aspects of one system for predicting localized population densities in accordance with embodiments of the present disclosure are shown. As is shown in FIG. 1A, a geographic map 130 of a parent cell or other region having a population P at a selected time is shown. The geographic map 130 indicates locations of various structures, functions or activities that are located or occurring therein. For example, the geographic map 130 identifies portions of the parent cell having suburban homes, e.g., single-family or multi-family dwellings, as well as yards, driveways, sidewalks, cul-de-sacs or other like features of such homes, and portions of the parent cell having bodies of water, e.g., ponds, lakes, reservoirs, rivers, streams, bays, portions of oceans, or other bodies. The geographic map 130 also identifies portions of the parent cell that include parks or other recreational areas, e.g., playgrounds, courts, fields, lawns, or other open spaces, as well as portions of the parent cell that are farmland, such as farms that grow crops such as fruits, vegetables or grains or raise animals such as fish, dairy cows, poultry, swine or cattle for local use or commercial sale. The geographic map 130 further identifies portions of the parent cell having malls or other commercial centers, schools or other educational facilities, and apartment or condominium towers or other like structures.

Figure 1B:
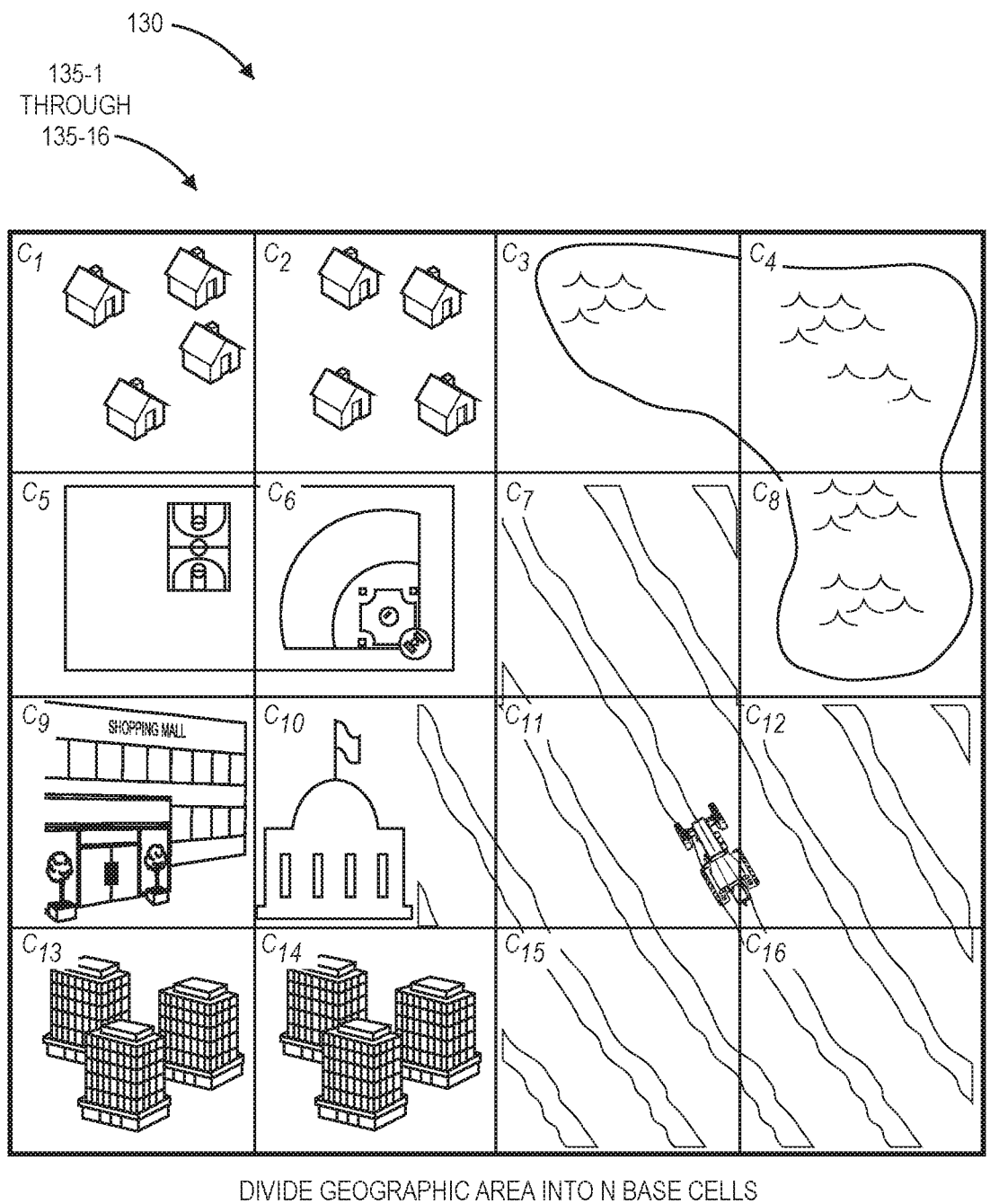

In accordance with embodiments of the present disclosure, the geographic map 130 of the parent cell may be further divided or subdivided into a plurality of base cells. For example, as is shown in FIG. 1B, the geographic map 130 is divided into base cells 135-1 through 135-16, each having a label $C_1$ through $C_{16}$. The base cells 135-1 through 135-16 may have any area or size, and may have any shape, e.g., the same shape as the geographic map 130 or the parent cell.

In some embodiments, the geographic map 130 may be divided or subdivided into N base cells, such as where N=16, as is shown in FIG. 1B, based on a maximum level of available resolution of available surface features, e.g., geographic information system (or "GIS") data, or on any other public or private information or data. Alternatively, the geographic map 130 may be divided into any number of base cells, and such base cells need not be limited to a four-by-four grid, such as is shown in FIG. 1B.

Figure 1C:
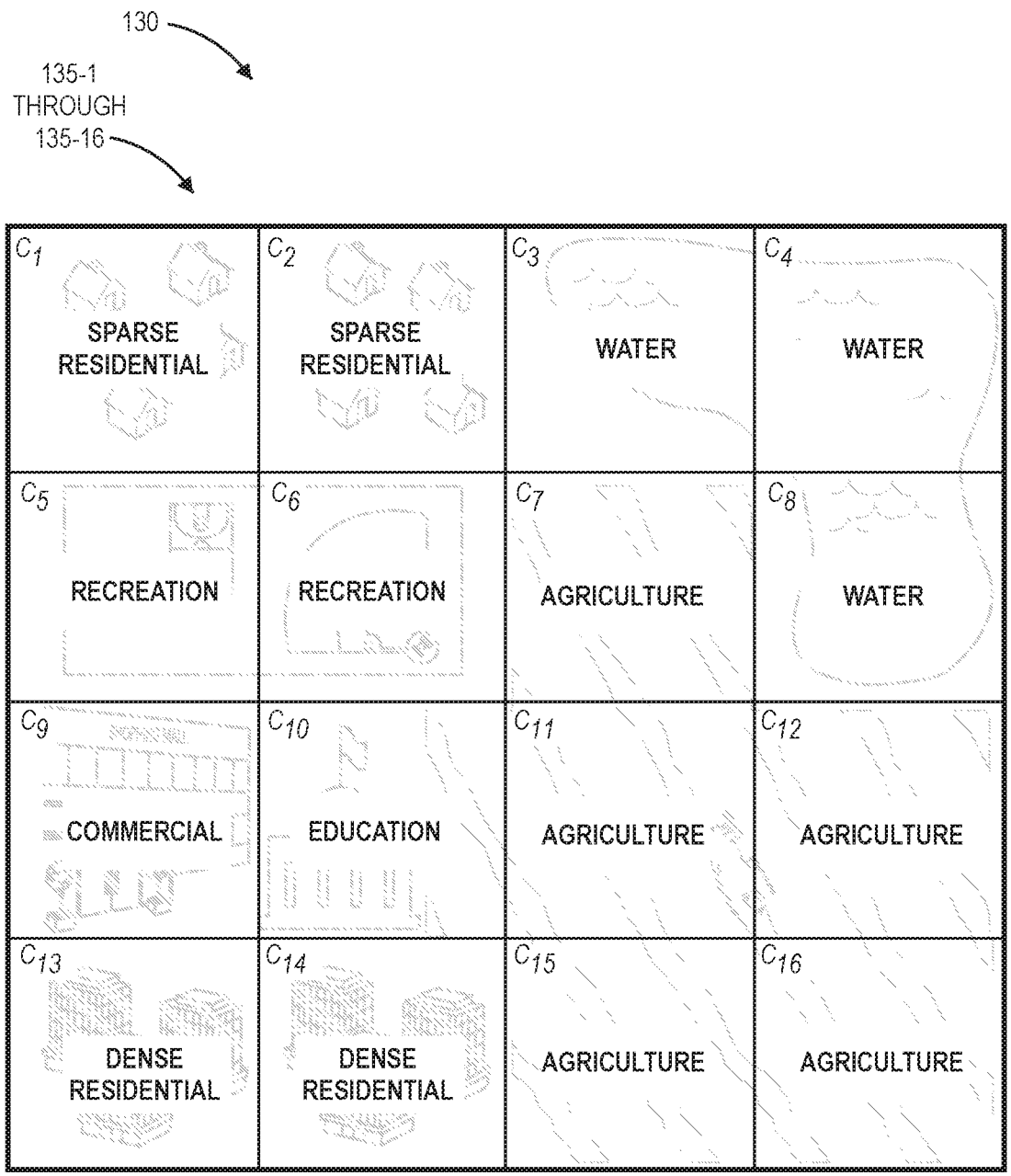

As is shown in FIG. 1C, dominant features of each of the base cells 135-1 through 135-16 may be determined based on any information or data that may be known or determined regarding the geographic map 130 of the parent cell or a region in which the parent cell is located. For example, data regarding building footprints, zoning designations, local infrastructure, ground surfaces, bodies of water, or other features may be determined from GIS data, digital elevation model data, digital terrain model data, orthoimages (or orthophotos), or others, which may be processed to identify one or more features within such base cells 135-1 through 135-16, e.g., and to determine which of such features most predominantly represents the base cells 135-1 through 135-16 as a whole. For example, as is shown in FIG. 1C, the base cells 135-1 and 135-2 are characterized as including sparse residential features, while the base cells 135-3, 135-4 and 135-8 are characterized as featuring bodies of water. The base cells 135-5 and 135-6 are characterized as recreation base cells, and the base cells 135-7, 135-11, 135-12, 135-15 and 135-16 are characterized as agricultural base cells. The base cell 135-9 is characterized as including commercial facilities, while the base cell 135-10 is characterized as including education facilities, and the base cells 135-13 and 135-14 are characterized as including dense residential features.

Where a base cell, such as the base cell 135-10, includes two or more ground features, a dominant one of the ground features may be identified to characterize the base cell at a selected time on any basis. For example, a dominant one of the ground features may be identified for the base cell 135-10 based on a percentage or share of the base cell 135-10 that is occupied by each of the structures, functions or activities that are located or occurring in the base cell 135-10 at the selected time. Alternatively, in some embodiments, an average or estimated population density associated with each of such ground features may be determined or predicted, and a dominant one of the ground features may be identified based on a greatest population density (or greatest population) associated with each of the ground features at the selected time. A dominant ground feature may be identified in any manner for each of the base cells 135-1 through 135-16 in accordance with the present disclosure.

Figure 1D:
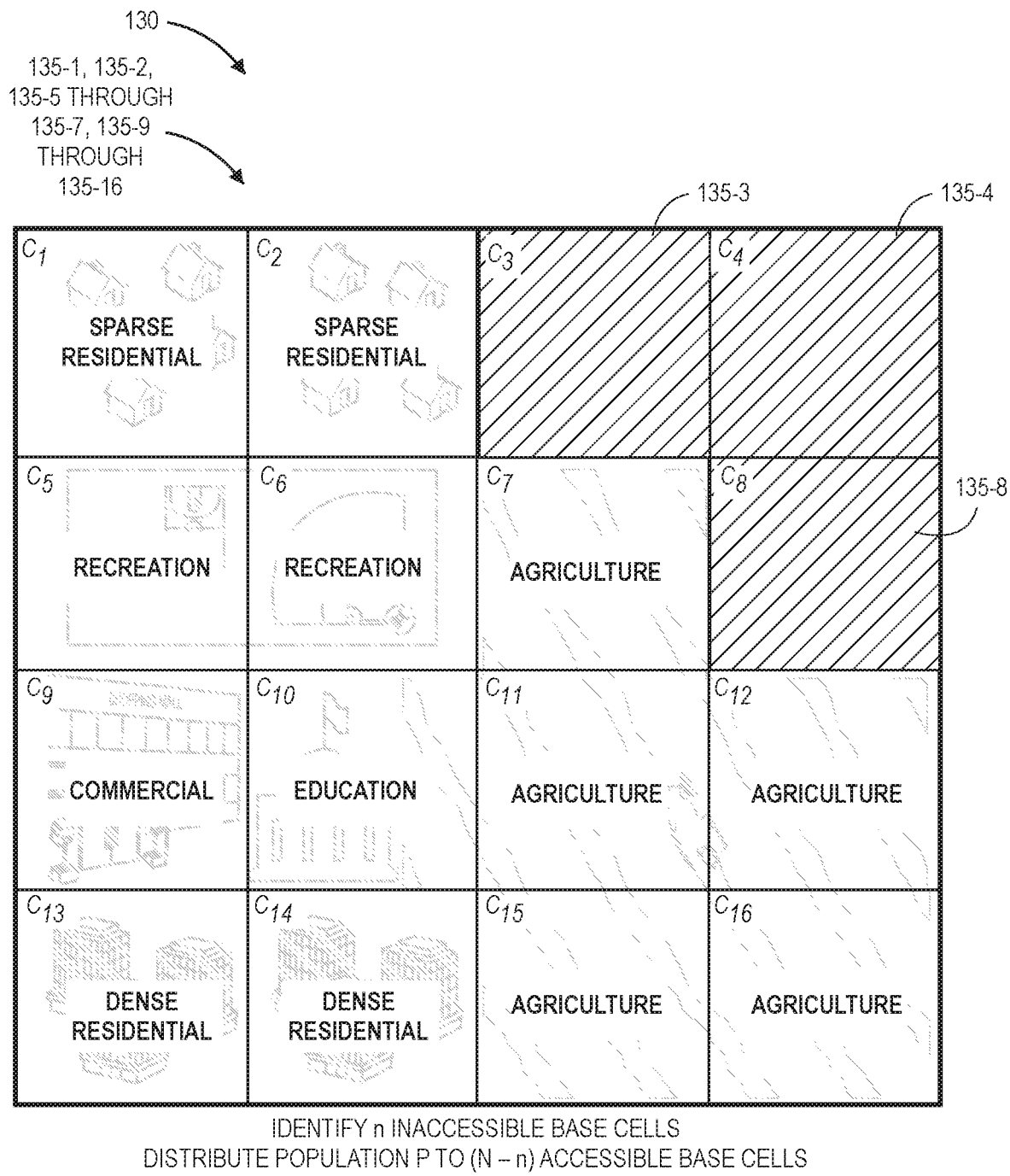

As is shown in FIG. 1D, because n base cells 135-3, 135-4, 135-8, viz., where n=3, are determined to include water, e.g., an inaccessible or unpopulated surface, as their dominant ground features, the base cells 135-3, 135-4, 135-8 are assumed to include none of the population P of the parent cell represented in the geographic map 130 at the selected time. Accordingly, the population P is initially distributed among the (N−n), or thirteen, base cells 135-1, 135-2, 135-5 through 135-7, 135-9 through 135-16, which are presumed to include a population P/(N−n) at the selected time. Each of the base cells 135-3, 135-4, 135-8 is presumed to include a population of zero at the selected time.

Figure 1E:
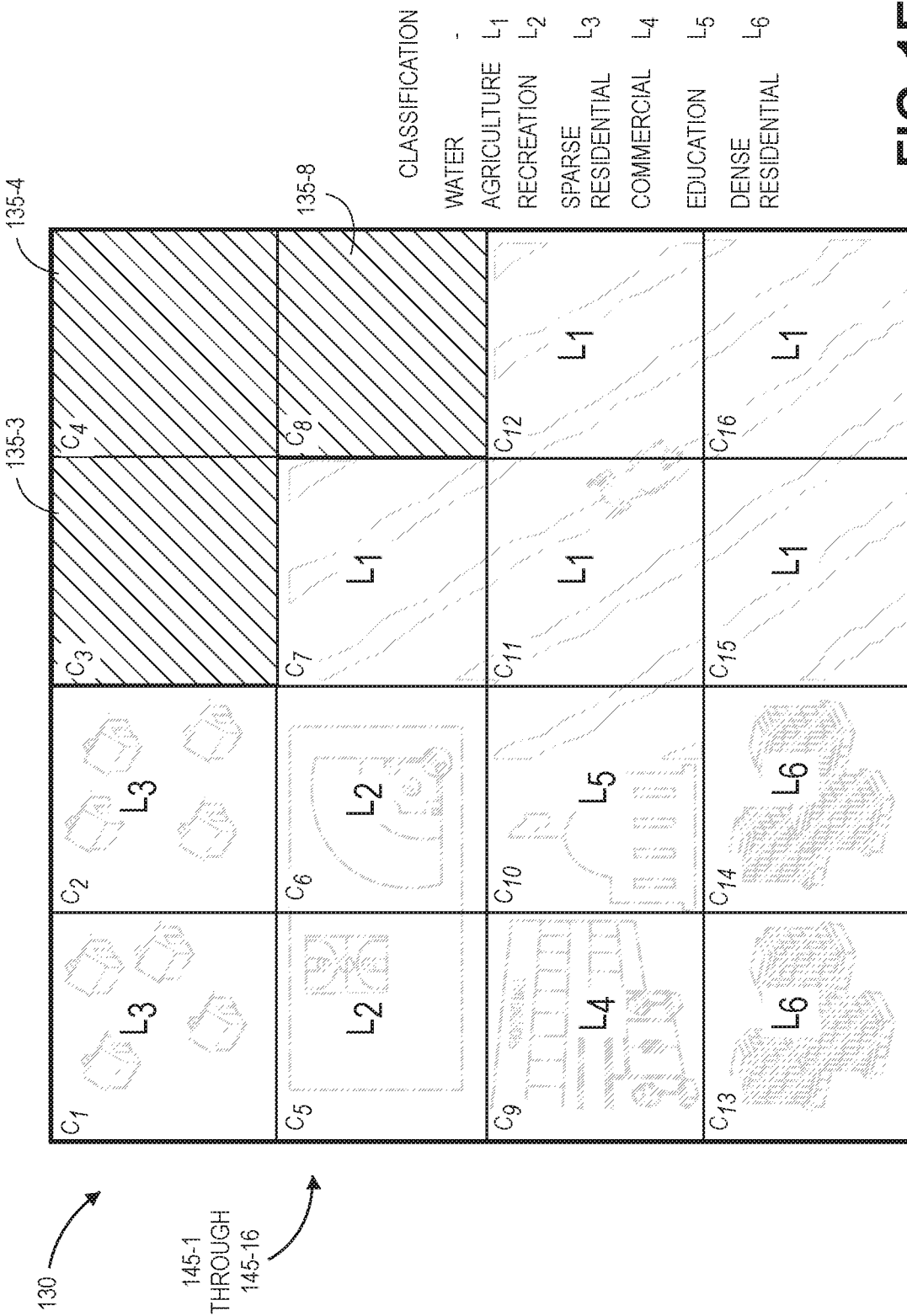

As is shown in FIG. 1E, the (N−n) base cells 135-1, 135-2, 135-5 through 135-7, 135-9 through 135-16 are classified by their dominant features at the selected time. The classifications 145-1 through 145-16 of the base cells 135-1, 135-2, 135-5 through 135-7, 135-9 through 135-16 may relate to a measure or level of population density of the respective base cells at the selected time, or may be determined on any other basis.

For example, as is shown in FIG. 1E, the base cells 135-7, 135-11, 135-12, 135-15, 135-16 are classified $L_1$, as having agricultural features. Meanwhile, the base cells 135-5, 135-6 are classified $L_2$, as having recreational features, while the base cells 135-1, 135-2 are classified $L_3$, as having sparse residential features, and the base cells 135-9, 135-10 are classified $L_4$ and $L_5$, as having commercial features and education features, respectively. The base cells 135-13, 135-14 are classified as having dense residential features. Because the base cells 135-3, 135-4, 135-8 are presumed to be inaccessible or unpopulated, the base cells 135-3, 135-4, 135-8 are not classified. Alternatively, the base cells 135-3, 135-4, 135-8 may be assigned a null classification, or a classification indicating that the populations of such base cells are zero.

As is shown in FIG. 1F, adjustment factors may be calculated for each of the base cells 135-1, 135-2, 135-5 through 135-7, 135-9 through 135-16 that are deemed accessible or populated based on their respective dominant ground features and/or classifications at the selected time. In order to determine a level of population within the respective base cells 135-1, 135-2, 135-5 through 135-7, 135-9 through 135-16, the unadjusted population P/(N−n) that is initially allocated to each of such cells is multiplied by an adjustment factor determined for that base cell at the selected time. Where an adjustment factor determined for a base cell has a value equal to one, multiplying the population initially assigned to the base cell by the adjustment factor results in a value equal to P/(N−n) being allocated to the base cell. Where an adjustment factor has a value greater than one, multiplying the population P/(N−n) initially assigned to the base cell by the adjustment factor results in a value greater than P/(N−n) being allocated to the base cell. Where an adjustment factor has a value less than one, multiplying the population P/(N−n) initially assigned to the base cell by the adjustment factor results in a value less than P/(N−n) being allocated to the base cell.

For example, as is shown in FIG. 1F, base cells having the classification $L_1$, viz., the base cells 135-7, 135-11, 135-12, 135-15, 135-16 that are predominantly directed to agriculture, are assigned an adjustment factor Ai at the selected time, and the population P/(N−n) initially assigned to each of such base cells is multiplied by the adjustment factor $A_1$, for an adjusted population $A_1 \cdot P/(N-n)$. For example, where the base cells 135-7, 135-11, 135-12, 135-15, 135-16 are presumed to have the lowest population densities of the accessible or populated base cells at the selected time, the base cells 135-7, 135-11, 135-12, 135-15, 135-16 may be assigned an adjustment factor having the lowest value, viz., the adjustment factor $A_1$, in order to reduce the population predicted for such base cells by the maximum extent.

As is also shown in FIG. 1F, base cells having the classification $L_2$, viz., the base cells 135-5, 135-6 that are predominantly dedicated to recreation, are assigned the adjustment factor $A_2$, and the population P/(N−n) initially assigned to each of such base cells is multiplied by the adjustment factor $A_2$, for an adjusted population $A_2 \cdot P/(N-n)$.

As is further shown in FIG. 1F, base cells having the classifications $L_3$, $L_4$, $L_5$, viz., the base cells 135-1, 135-2 that are predominantly directed to sparse residential features, the base cell 135-9 that is predominately directed to commercial uses, and the base cell 135-10 that is predominantly directed to educational functions, are assigned the adjustment factor $A_3$, and the population initially assigned to each of such base cells is multiplied by the adjustment factor $A_3$, for an adjusted population $A_3 \cdot P/(N-n)$.

Finally, as is also shown in FIG. 1F, base cells having the classification $L_6$, viz., the base cells 135-13, 135-14, that are predominantly directed to dense residential features, are assigned the adjustment factor $A_4$, and the population P/(N−n) initially assigned to each of such base cells is multiplied by the adjustment factor $A_4$, for an adjusted population $A_4 \cdot P/(N-n)$.

Values of the adjustment factors $A_1$, $A_2$, $A_3$, $A_4$ may be calculated for the accessible and populated base cells at the selected time on any basis, and may vary as functions of time. For example, for the base cell 135-10, which is assigned a classification of $L_5$ and is predominantly directed to educational functions, an adjustment factor corresponding to a high population density may be calculated when one or more schools within the base cell 135-10 are open and fully operational, e.g., between the hours of eight o'clock a.m. and four o'clock p.m. on weekdays. Conversely, an adjustment factor corresponding to a low population density may be calculated when one or more schools within the base cell 135-10 are closed or are not in session, e.g., between the hours of four o'clock p.m. and eight o'clock a.m. on weekdays, or on weekends.

Likewise, for the base cells 135-13, 135-14, which are assigned a classification of $L_6$ and are dominated by dense residential structures, an adjustment factor corresponding to a low population density may be calculated when residents are at work or in school, e.g., between the hours of eight o'clock a.m. and four o'clock p.m. on weekdays, and an adjustment factor corresponding to a high population density may be calculated at other times, e.g., between the hours of four o'clock p.m. and eight o'clock a.m. on weekdays, or on weekends, when residents are at home. The adjustment factors calculated for the base cells 135-1, 135-2, which are assigned a classification of $L_3$ and are dominated by sparse residential structures, may be varied similarly.

Any factor relating to a population density of a base cell or a classification of the base cell at a given time may be considered in calculating an adjustment factor for the base cell in accordance with the present disclosure. Additionally, as is discussed above, where information or data regarding deviations of populations within one or more base cells is known or determined, populations of the base cells that are calculated based on portions of a population of a parent cell allocated to such base cells multiplied by adjustment factors calculated for the respective base cells may be increased or decreased accordingly. For example, where the population of the parent cell of the geographic map 130 is determined based on census data, or is otherwise calculated as averages over extended periods of times, brief or irregularly occurring events such as accidents, traffic jams, parades, sporting events, holiday celebrations or the like may cause increases or decreases in localized population densities that may, in some embodiments, not be reflected in the population of the parent cells or adjustment factors calculated for base cells.

Figure 1G:
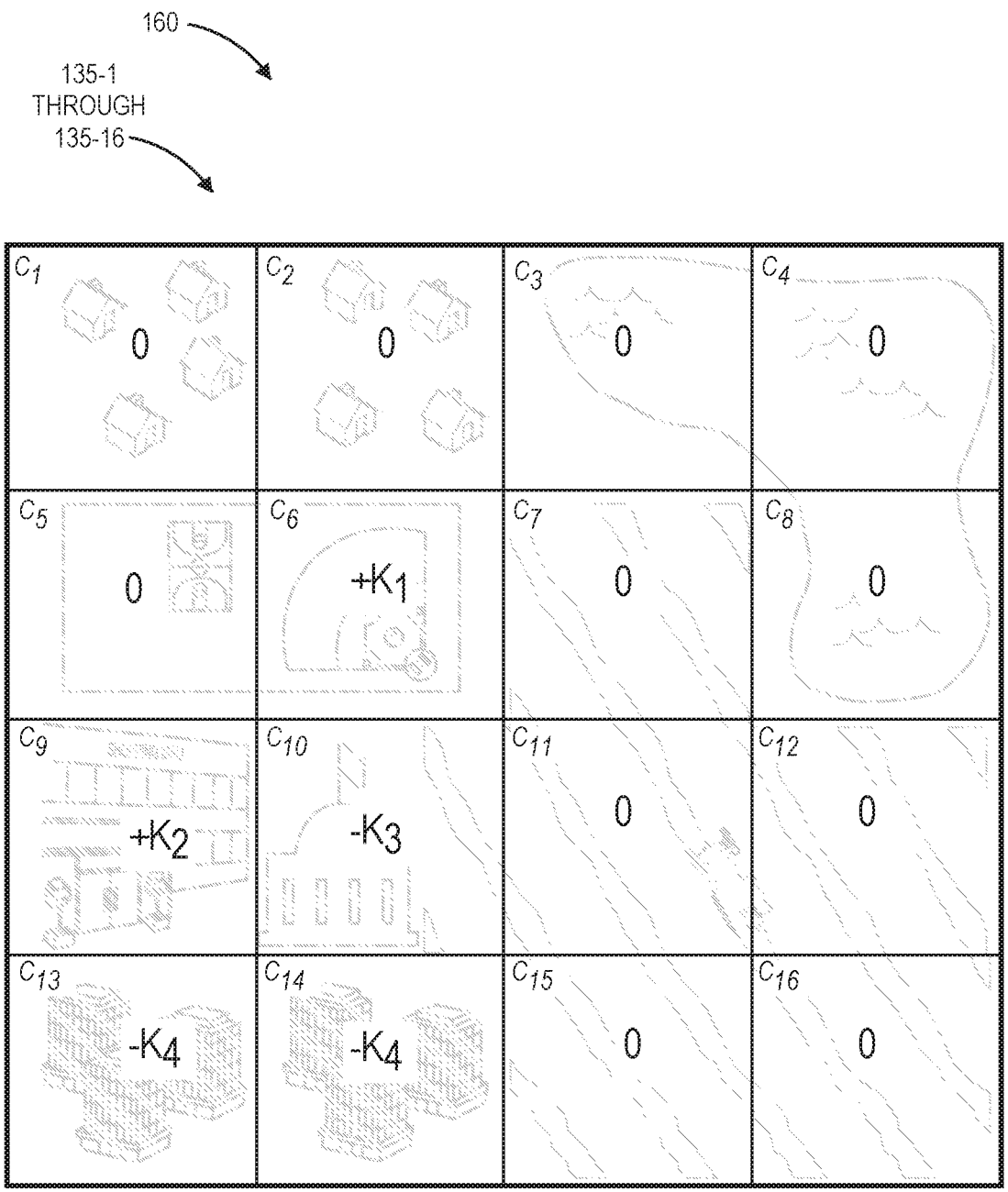

As is shown in FIG. 1G, estimated population deviations for the base cells 135-1 through 135-16 at the selected time are shown. For example, as is shown in FIG. 1G, for the base cells 135-1 through 135-5, 135-7, 135-8, 135-11, 135-12, 135-15, 135-16, no population deviations are anticipated. As is also shown in FIG. 1G, a population deviation of $+K_1$ is anticipated for the base cell 135-6, while a population deviation of $+K_2$ is anticipated for the base cell 135-9, a population deviation of $-K_3$ is anticipated for the base cell 135-10, and a population deviation of $-K_4$ is anticipated for the base cells 135-13, 135-14.

Figure 1H:
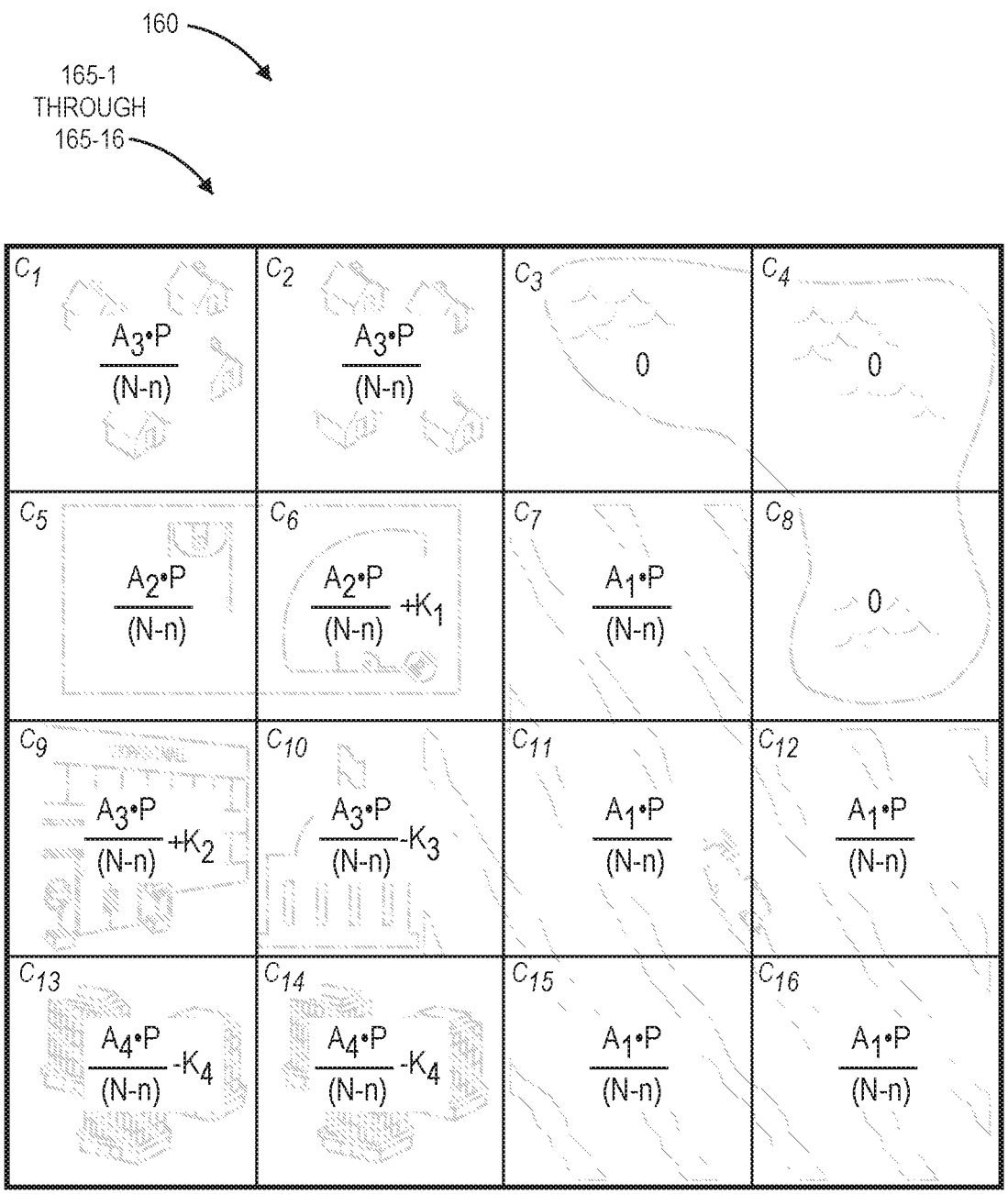

As is shown in FIG. 1H, a population map 160 for route planning is generated with population densities 165-1 through 165-16 calculated for each of the base cells 135-1 through 135-16 of the parent cell. For example, the population map 160 includes population density values of zero for the base cells 135-3, 135-4, 135-8, which have been determined to be inaccessible or unpopulated and population density values of $A_3 \cdot P/(N-n)$ for the base cells 135-1, 135-2. The population map 160 also includes a population density value of $A_2 \cdot P/(N-n)$ for the base cell 135-5, and population density values of $A_1 \cdot P/(N-n)$ for the base cells 135-7, 135-11, 135-12, 135-15, 135-16.

The population map 160 further includes population density values for base cells that take into account the population deviations that are estimated or anticipated for such base cells, such as is shown in FIG. 1G. For example, as is shown in FIG. 1H, the population map 160 includes a population density value of $A_2 \cdot P/(N-n)+K_1$ for the base cell 135-6, a population density value of $A_3 \cdot P/(N-n)+K_2$ for the base cell 135-9, a population density value of $A_3 \cdot P/(N-n)-K_3$ for the base cell 135-10, and population density values of $A_4 \cdot P/(N-n)-K_4$ for the base cells 135-13, 135-14, reflecting the population deviations that were determined for each of the base cells 135-6, 135-9, 135-10, 135-13, 135-14, as shown in FIG. 1G.

After the population map 160 has been generated, the population map 160 may be used to determine one or more safe routes or paths for a vehicle, e.g., an unmanned aerial vehicle, when performing a mission. In some embodiments, routes or paths determined for a vehicle may have either an origin or a destination within the parent cell shown in the geographic map 130, or may require the vehicle to travel over or near one or more portions of the parent cell shown in the geographic map 130. The routes or paths that are determined based on the population map 160 may be selected in order to meet any standards or requirements of safety or reliability for the mission, which may change from time to time, such as by reducing or minimizing population densities over or through which the vehicle will travel while performing the mission.

For example, in some embodiments, a route or path may be selected for a vehicle, such as an aerial vehicle, according to a search algorithm, or a cost minimization algorithm, that considers costs of traveling between various points within the population map 160. In some embodiments, the search algorithm may be an A* search algorithm that calculates a unitless measure of cost associated with traveling from an origin in one of the base cells 135-1 through 135-16, or elsewhere outside of the parent cell, to any of the other cells 135-1 through 135-16, or anywhere else outside of the parent cell.

Accordingly, the systems and methods of the present disclosure are directed to determining localized population densities within a region based on population data for the region and conditions existing on the ground at a selected time. A parent cell or other geographic representation of a region may be divided or subdivided into base cells. Population data or other intrinsic data for the region at the selected time may be identified and allocated uniformly to base cells that are known or believed to be accessible or inhabited base cells, and not to inaccessible or uninhabited base cells. Where information or data regarding ground features within the respective base cells at the selected time is known, adjustment factors may be calculated to adjust the portions of the population of the region to such base cells according to the adjustment factors, e.g., by multiplying a portion of a population allocated to such base cells by such adjustment factors, in a manner than ensures that the entire population of the region is allocated to the base cells that are accessible or populated. Additionally, where information regarding deviations from predicted localized populations in one or more of the base cells is known, the populations calculated for such base cells based on a portion of a population of a parent cell multiplied by an adjustment factor may be increased or decreased accordingly to account for such deviations. Moreover, two or more base cells having similar population densities may be aggregated into a child cell, which may be considered together in generating a population map (or a population density map) of the region.

The population maps, or population density maps, of the present disclosure may represent virtual snapshots of population of a region represented in a parent cell at a selected time. In some embodiments, population maps may be generated based on population data for a parent cell at regular intervals, e.g., fifteen minute intervals. In such embodiments, when a mission is to be performed within, over or near a region represented in a parent cell at a selected time, a population map that was calculated based on population data that is most closely relevant to the selected time may be used to select a route or a path for performing the mission. Alternatively, a population map may be generated in real time or in near-real time, for any given time, based on any population data that may be available for a parent cell at that time.

Additionally, where actual data (e.g., ground truth data) regarding populations or ground features in one or more base cells at a selected time is determined, the actual data may be compared to data used to generate an adjustment factor for the one or more base cells or predict a population density within the one or more base cells, including not only populations of the base cells but also information or data regarding ground features within the base cells. Where bias is identified based on a difference between the actual data regarding a base cell and a population density predicted for the base cell, one or more adjustment factors calculated for the base cell or for other base cells may be modified accordingly to take into account such bias.

In some embodiments, population data for a parent cell or region may be obtained from a public or private source, such as one or more sets of data, e.g., LandScan data maintained by the United States Department of Energy's Oak Ridge National Laboratory, WorldPop data maintained by the University of Southampton, or any other sets of data, including but not limited to data regarding building footprints, zoning designations, local infrastructure, ground surfaces, bodies of water, or other features, which may be determined from GIS data, digital elevation model data, digital terrain model data, orthoimages (or orthophotos), or other sources. Additionally, one or more of the systems or methods disclosed herein may be performed by one or more servers or back-end machines, in a "cloud"-based environment, or by one or more processors or control systems provided aboard a vehicle, e.g., an aerial vehicle, in real time or in near-real time.

Figure 2:
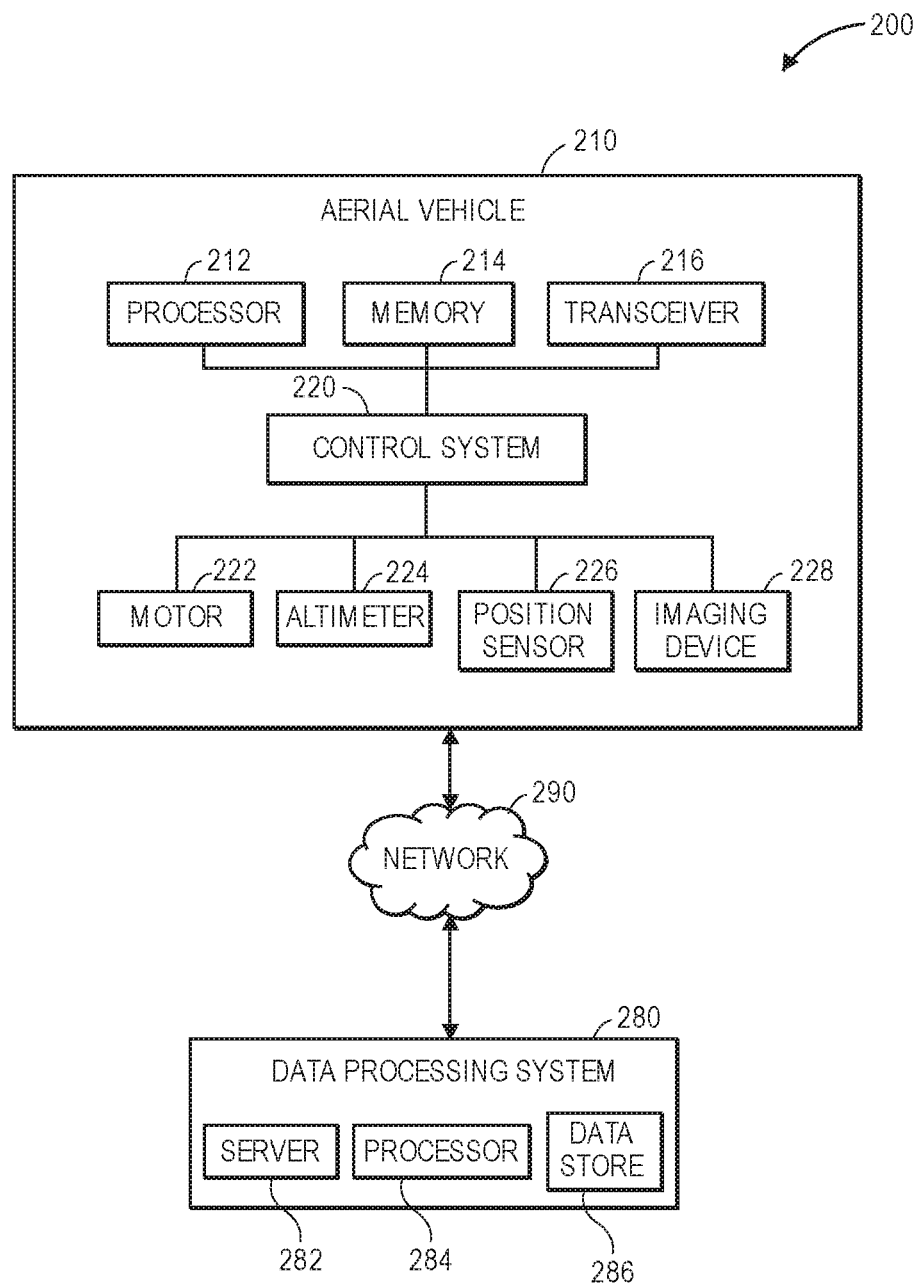
FIG. 2 is a block diagram of one system for predicting localized population densities in accordance with embodiments of the present disclosure.

Referring to FIG. 2, a block diagram of one system 200 for predicting localized population densities in accordance with embodiments of the present disclosure is shown. The system 200 of FIG. 2 includes an aerial vehicle 210 and a data processing system 280 connected to one another over a network 290, which may include the Internet in whole or in part. Except where otherwise noted, reference numerals preceded by the number "2" shown in FIG. 2 indicate components or features that are similar to components or features having reference numerals preceded by the number "1" shown in FIGS. 1A through 1H.

As is shown in FIG. 2, the aerial vehicle 210 includes a processor 212, a memory 214 and a transceiver 216. The aerial vehicle 210 further includes a control system 220, a plurality of propulsion motors 222, an altimeter 224, a position sensor 226 and an imaging device 228.

The processor 212 may be configured to perform any type or form of computing function associated with the operation of the aerial vehicle 210, including but not limited to the execution of one or more machine learning algorithms or techniques. The processor 212 may also be configured to execute any other algorithms or techniques (e.g., object detection or recognition algorithms or techniques) associated with one or more applications, purposes or functions, e.g., to select at least one of a course, a speed, an altitude or an orientation (e.g., one or more of a yaw angle, a pitch angle or a roll angle) for the safe operation of the aerial vehicle 210.

For example, the processor 212 may be configured to control any aspects of the operation of the aerial vehicle 210 and the one or more computer-based components thereon, including but not limited to the propulsion motors 222, the altimeter 224, the position sensor 226 and/or the imaging device 228. The processor 212 may control the operation of one or more control systems or modules, such as the control system 220, for generating instructions for conducting operations of one or more of the propulsion motors 222, the altimeter 224, the position sensor 226 and/or the imaging device 228, or for interpreting information or data captured using one or more other sensors. Such control systems or modules may be associated with one or more other computing devices or machines, and may communicate with the data processing system 280 or one or more other computer devices or aerial vehicles (not shown) over the network 290, by the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., map data, or instructions for operating the aerial vehicle 210, or information or data captured during operations of the aerial vehicle 210. For example, the memory 214 may be configured to store any relevant information regarding the operation of the aerial vehicle 210 including but not limited to courses, speeds, altitudes or orientations of the aerial vehicle 210 at one or more locations, or one or more operating characteristics (e.g., numbers of propulsion motors 222 that are operating and at which speeds, numbers of control surfaces that are operated and at which angles or distances), environmental conditions (e.g., weather projections, ground conditions, cloud coverage, sunshine or other information or data), imaging data or any other information or data regarding such locations. The memory 214 may be configured to store executable instructions, imaging data, flight routes or paths, or flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight routes or paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or I/O devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, or to aerially transport any payload engaged thereby. In some embodiments, one or more of the propulsion motors 222 may be a brushless direct current ("DC") multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features. For example, alternatively, or additionally, the aerial vehicle 210 may include one or more other devices, components, systems or instruments for determining information or data regarding the operation of the aerial vehicle, including but not limited to one or more airspeed sensors (e.g., any type or form of anemometer or other system for determining a speed of air flow within a vicinity of the aerial vehicle 210), which may include one or more pitot tubes, ultrasonic transceivers (e.g., transmitters and/or receivers) or other devices, components, systems or instruments, which may operate independently or in conjunction with one another. The aerial vehicle 210 may also include one or more other devices, components, systems or instruments for determining an altitude of the aerial vehicle 210, e.g., an altimeter or other device, component, system, or instrument having any number of barometers, transmitters, receivers, range finders (e.g., laser or radar), imaging devices or other features for determining altitudes above ground. For example, in some embodiments, the aerial vehicle 210 may include an inertial measurement unit having one or more accelerometers, gyroscopes or magnetometers (e.g., compasses), and the position sensor 226 may be a component part of the inertial measurement unit, or a separate component.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the altimeter 224, the position sensor 226 and the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more acoustic sensors or other devices, components, systems or instruments for capturing and/or interpreting acoustic energy, including but not limited to one or more microphones (e.g., a transducer such as a dynamic microphone, a condenser microphone, a ribbon microphone or a crystal microphone) that are configured to convert acoustic energy of any intensity and across any or all frequencies into one or more electrical signals. Such acoustic sensors may be mounted to or distributed throughout an airframe or other structure of the aerial vehicle 210 and may include any number of diaphragms, magnets, coils, plates, or other like features for detecting and recording such energy), piezoelectric sensors (e.g., sensors configured to convert changes in pressure to electrical signals, including one or more crystals, electrodes or other features), or vibration sensors. The aerial vehicle 210 may further include one or more compasses, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or other sensors.

Although the block diagram of FIG. 2 includes a single box for an aerial vehicle 210, a single box for a propulsion motor 222, a single box for an altimeter 224, a single box for a position sensor 226, and a single box for an imaging device 228, those of ordinary skill in the pertinent arts will recognize that the system 200 may include any number or type of aerial vehicles, propulsion motors, altimeters, position sensors, imaging devices or other sensors, or customers, in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to geographic maps of one or more regions, locations or boundaries of one or more of such regions, population data covering such regions, locations of infrastructure within such regions, or any other factors. Alternatively, the data processing system 280 may be provided in connection with one or more physical or virtual services that are configured to receive, analyze or store such information or data, or other information or data, as well as one or more other functions. In some embodiments, the data processing system 280 of FIG. 2 may be configured to receive, analyze or store information or data relating to operations of the aerial vehicle 210, including positions (e.g., latitudes, longitudes and/or altitudes) of the aerial vehicle 210 at various times, or imaging data captured using the imaging device 228.

In some embodiments, the data processing system 280 may be associated with one or more electronic marketplaces (e.g., online marketplaces), physical (e.g., bricks-and-mortar) marketplaces, fulfillment centers, materials handling facilities, warehouses, distribution centers, cross-docking facilities, order fulfillment facilities, packaging facilities, shipping facilities, rental facilities, libraries, retail stores or establishments, wholesale stores, museums, or any other facilities or systems. Alternatively, the data processing system 280 may be maintained separate and apart (e.g., independent) of or from any such facilities.

The servers 282 may be connected to or otherwise communicate with the processors 284 and the data stores 286, which may store any type of information or data, including but not limited to information or data regarding regions, geographic maps of areas within such regions, population data, paths or routes, ground features, or other information or data, as well as courses, speeds, altitudes, orientations, operating characteristics of such aerial vehicles within such regions.

The servers 282 may be configured to execute one or more algorithms to generate one or more of the maps disclosed herein, including but not limited to geographic maps, population maps or others, or to determine routes or paths to be traveled by aerial vehicles based on such maps, in accordance with one or more search algorithms, or to generate modifications to such maps, routes or paths.

The servers 282 and/or the computer processors 284 may also connect to or otherwise communicate with the network 290 through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other I/O interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to execute one or more calculations regarding routes or paths to be traveled by the aerial vehicle 210, based on population data or other ground conditions within a vicinity of the aerial vehicle 210, or in a region where the aerial vehicle 210 is operating. In some embodiments, the processor 212, the servers 282 and/or the processors 284 may be configured to generate two-dimensional or three-dimensional models or other representations of population density or other data within one or more regions. In some embodiments, the processor 212, the servers 282 and/or the processors 284 may be configured to determine an optimal path or route between two locations for the execution of a given mission or task by the aerial vehicle 210 or one or more other aerial vehicles (not shown), such as according to any number of algorithms or techniques, including not only an A* search algorithm, but also one or more traditional shortest path or shortest route algorithms such as Dijkstra's Algorithm, Bellman-Ford Algorithm, Floyd-Warshall Algorithm, Johnson's Algorithm or a hub labeling technique. The processor 212, the servers 282 and/or the processors 284 may determine an optimal path or route based on any factor or element, or any other intrinsic or extrinsic factors.

In some embodiments, the processor 212, the server 282 and/or the processors 284 may be configured to execute one or more machine learning systems or techniques. For example, in some embodiments, an artificial neural network or other machine learning system or technique may be trained to receive inputs in the form of information or data regarding population densities within a region, and to generate paths or routes, or modifications to paths or routes, based on outputs generated in response to such inputs. In some other embodiments, the inputs may further include information or data regarding surface features, topography, or terrain features at the one or more locations. In accordance with the present disclosure, an artificial neural network or other machine learning system may be trained in a supervised or unsupervised manner, and may include any number of neurons in any number of layers, including an input layer, an output layer, and one or more intervening hidden layers. A machine learning system, such as an artificial neural network, may be further trained using any information, data or metadata in accordance with embodiments of the present disclosure.

The aerial vehicle 210 and/or the data processing system 280 may use any web-enabled or Internet applications or features, or any other client-server applications or features including E-mail or other messaging techniques, to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, smart speakers, electronic book readers, and the like.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the algorithms, techniques or functions described herein as being performed or executed by one or more of the processor 212, the memory 214, or the control system 220 of the aerial vehicle 210 may be performed or executed by one or more of the server 282, the processor 284 or the data store 286, or vice versa.

Figure 3A:
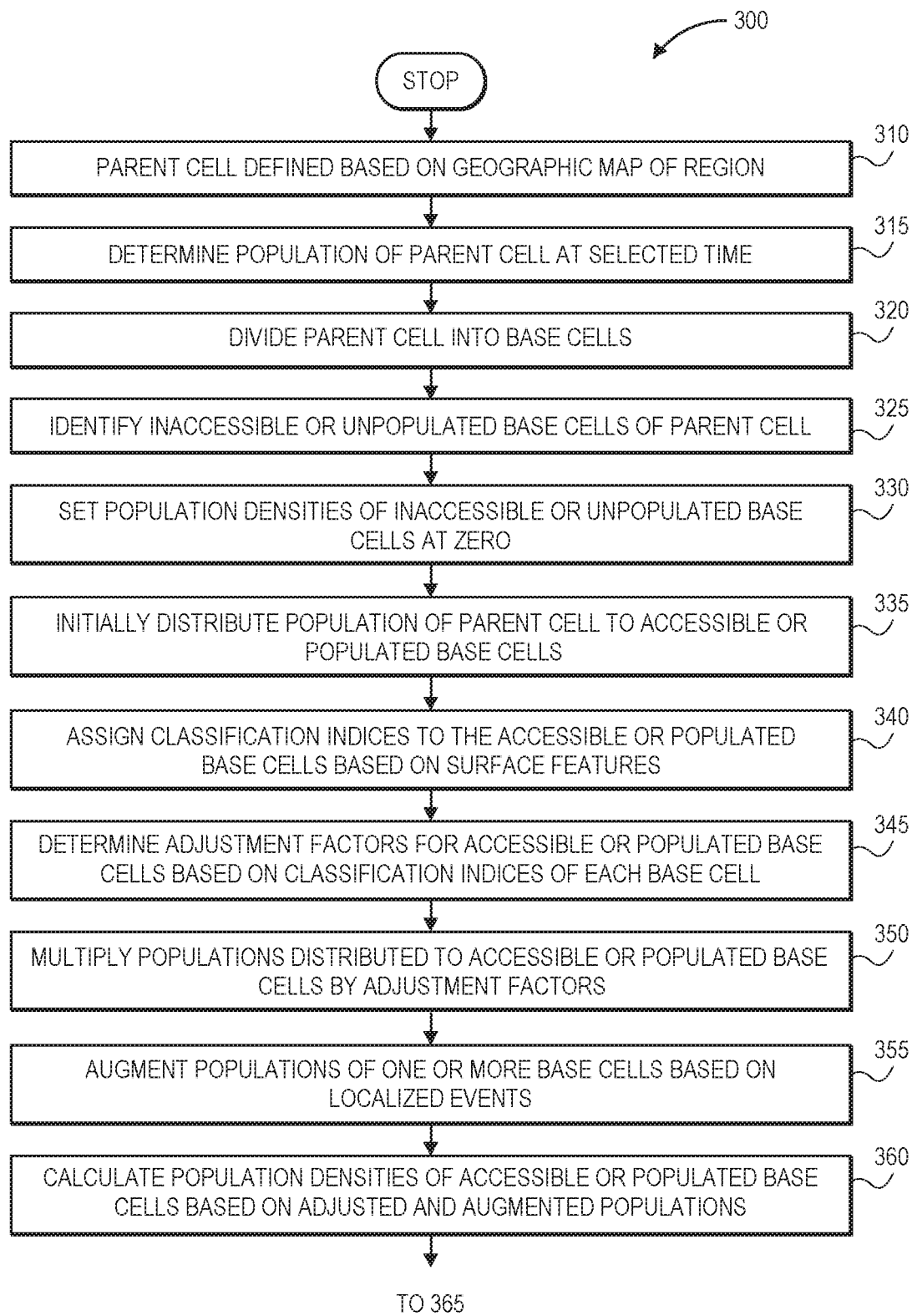
FIGS. 3A and 3B are a flow chart of one process for predicting localized population densities in accordance with embodiments of the present disclosure.
Figure 3B:
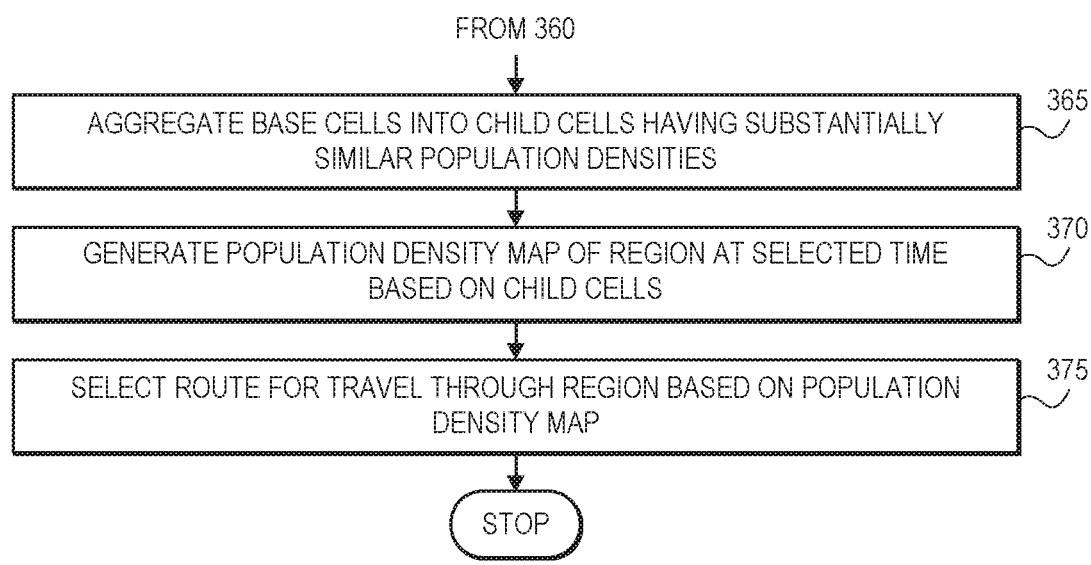

As is discussed above, the systems and methods of the present disclosure are directed to predicting localized population densities for use in selecting paths or routes for travel by aerial vehicles during missions or other flight operations. Referring to FIGS. 3A and 3B, a flow chart 300 of one process for predicting localized population densities in accordance with embodiments of the present disclosure is shown.

At box 310, a parent cell is defined based on a geographic map of a region. For example, in some embodiments, the parent cell may have an area of approximately one square kilometer, or one million square meters, and a square shape. Alternatively, the parent cell may have any other area or size, and any other shape.

The geographic map may depict any aspects of ground surfaces within or around the parent cell, or ground surfaces surrounding the parent cell, e.g., ground surfaces within or around neighboring cells. For example, the geographic map may depict any natural features or elements such as land masses, plant life, or water courses but also artificial features or elements such as buildings (e.g., homes, offices, or other structures), transportation systems, or other components of infrastructure. The geographic map may take the form of a raster image, a vector image, or any other type or form of representation, and may have been previously generated based on images captured by airborne or space-based systems, based on geographic information system (or "GIS") data, or based on any other public or private information or data, either in real time or near-real time, or at any prior time. The region may have any shape, with borders or boundaries defined with respect to one or more natural or artificial objects, or in accordance with one or more rules, regulations or laws. For example, the region or the parent cell may include, but need not be limited to, formally defined (e.g., incorporated) tracts of land such as states, counties or municipalities, or portions thereof, as well as unincorporated land or informally defined areas.

At box 315, a population of the parent cell is determined at a selected time, e.g., one or more minutes, hours, days, weeks or years, or a range of minutes, hours, days, weeks or years. In some embodiments, the selected time may have any duration, or may be an average or general time associated with a population of a parent cell. For example, where a population of a parent cell is determined according to a census, e.g., a population of a census block, that population may be relied upon for any period of time before which the population may be deemed to be obsolete or unreliable, e.g., any number of days, months, or years, such as until a next census is taken. In some other embodiments, however, the selected time may be a specific hour, minute or range of hours or minutes within a given day, or a range of days within a given week, month or year. In some other embodiments, the selected time may relate to an event or condition that occurs at regular intervals, at regularly scheduled times, at random, or at any other times, e.g., a time associated with rush hour within the parent cell, a St. Patrick's Day parade passing through the parent cell, or a sporting event or other mass gathering occurring in the parent cell.

In some embodiments, population data for the region in general, or for the parent cell in particular, may be obtained from any public or private source. For example, in some embodiments, the population data may include one or more sets of data for the region or for geographic subsets of the region that are maintained by the United States Department of Energy's Oak Ridge National Laboratory, viz., LandScan data, or by the University of Southampton, viz., WorldPop data. Alternatively, the population data may be obtained from any other source, and the geographic subsets may have any other size.

At box 320, the parent cell is divided into a plurality of base cells, which may have any size or area with respect to a size or area of the parent cell. For example, in some embodiments, where a parent cell has a size or area of one square kilometer, and has a shape of a square, the parent cell may be divided or subdivided into any number of base cells of other areas or sizes and of any other shapes, e.g., other squares, such as ten thousand base cells having dimensions of ten meters by ten meters (10 m×10 m), four hundred base cells having dimensions of fifty meters by fifty meters (50 m×50 m), one hundred base cells having one hundred meters by one hundred meters (100 m×100 m), sixteen base cells having dimensions of two hundred fifty meters by two hundred fifty meters (250 m×250 m), or any number of base cells having any other area or size. Alternatively, the parent cell may be divided or subdivided into any other number of base cells. The borders or boundaries of base cells within the parent cell may be stored in association with the region or the parent cell, e.g., as one or more layers of the geographic map, or determined based on data obtained from any other source.

At box 325, base cells that are inaccessible or substantially unpopulated are identified. For example, where one or more of the base cells defined at box 320 are determined or predicted to include portions of bodies of water that are not navigable, or are known or predicted to have low or insignificant numbers of aquatic traffic, swimmers, bathers or persons engaged in other activities thereon. Alternatively, the base cells that are deemed inaccessible or substantially unpopulated may include any number of solid surfaces, and need not be limited to base cells including bodies of water. For example, base cells may be deemed inaccessible or substantially unpopulated where ground surfaces within such cells include dense forests or steep hills or mountains, or are otherwise impassible, e.g., snowy, muddy or rocky surfaces.

At box 330, a population density of each of the base cells that are identified as inaccessible or substantially unpopulated at box 325 are set to zero. At box 335, the population of the parent cell at the selected time is initially distributed to the accessible or populated base cells of the parent cell. For example, where the parent cell is divided into a number of base cells at box 320, and a number of inaccessible or unpopulated base cells of the parent cell are identified at box 325, the population of the parent cell at the selected time may be distributed across the accessible or populated base cells only, and not across the inaccessible or unpopulated base cells.

At box 340, classification indices are assigned to the base cells of the parent cell that are deemed accessible or populated, e.g., base cells that are not deemed inaccessible or substantially unpopulated, based on one or more surface features that are present within such cells. For example, each of the base cells may be classified based on a number or type of building or other structure provided therein, as well as a number or type of event or activity occurring within the base cell, or any other attributes of the base cell, and a classification index assigned to a given base cell may be determined based on such classifications. The classification indices may represent classifications of the base cells, which may be determined based at least in part on structures, functions or activities performed on ground surfaces within such base cells at the selected time, as well as residences of any density, such as single-family homes, duplexes or triplexes, or larger apartment structures. Alternatively, or additionally, base cells may be classified based on commercial, retail, industrial, manufacturing or other business functions; farms or other agricultural functions; parks, stadiums, fields, or other recreational facilities, or any other structures, functions or other activities occurring within such base cells at the selected time.

At box 345, adjustment factors are determined for each of the accessible or populated base cells based on the classification indices determined for each base cell. For example, where the classification indices indicate or imply that a base cell has a comparatively high population density at a selected time, e.g., where ground surfaces of the base cell include high-rise apartment or office buildings, stadiums, transportation centers or other structures, functions or activities of high value or importance, e.g., critical infrastructure such as hospitals, schools, or others, an adjustment factor reflective of the population densities or values of such structures, functions or activities at the selected time may be determined for the base cells. For example, an adjustment factor calculated for a base cell having one or more high-rise apartment buildings may have a comparatively high value when residents are believed to be at home, e.g., on weekends, or at times other than traditional school or working hours on weekdays, and a comparatively low value when residents are believed to be not at home, e.g., during traditional school or working hours on weekdays. Conversely, an adjustment factor calculated for a base cell having one or more schools or office buildings may have a comparatively high value when the schools or office buildings are believed to be occupied, e.g., during traditional school or working hours, and a comparatively low value when the schools or office buildings are believed to be unoccupied.

Any number of adjustment factors may be determined for the accessible or populated base cells. For example, the adjustment factors may be calculated for various classes of base cells, including base cells that are classified based on their respective population densities at selected times, or various classes of structures, functions or activities that are located or occurring therein.

At box 350, the populations distributed to the accessible or populated base cells are multiplied by their adjustment factors determined according to their respective classification indices at box 345. For example, where a parent cell that has a population P is subdivided into N base cells, and n base cells are deemed inaccessible or substantially unpopulated, each of the base cells that is determined to be accessible or populated is initially assigned a population of P/(N−n). Subsequently, a population of a given base cell at a selected time may be multiplied by the adjustment factor calculated for that base cell at the selected time. For example, where an adjustment factor determined for a base cell has a value equal to one, multiplying the population initially assigned to the base cell by the adjustment factor results in a population equal to P/(N−n) being allocated to the base cell, e.g., with no change on account of the adjustment factor. Where an adjustment factor has a value greater than one, multiplying the population P/(N−n) initially assigned to the base cell by the adjustment factor results in a population greater than P/(N−n) being allocated to the base cell, e.g., with an increase on account of the adjustment factor. Where an adjustment factor has a value less than one, multiplying the population P/(N−n) initially assigned to the base cell by the adjustment factor results in a population less than P/(N−n) being allocated to the base cell, e.g., with a decrease on account of the adjustment factor. The population P may be allocated to the (N−n) base cells in a manner that ensures that the entire population of the parent cell determined at box 315 is allocated to the base cells that are determined to be accessible or populated.

At box 355, populations distributed to the one or more base cells are augmented based on local conditions within the respective base cells. For example, to the extent that conditions within one or more of the base cells at the selected time deviate from normal or standard conditions under which the population of the parent cell was determined at box 315, or pursuant to which the adjustment factors were determined at box 345, the populations determined by multiplying portions of the population of the parent cell by the respective adjustment factors calculated for the accessible or populated base cells may be modified accordingly, e.g., by adding population to or removing population from one or more of the base cells to reflect local conditions within such cells.

For example, where population within one or more base cells is temporarily increased or decreased on account of congestion (e.g., a traffic jam, equipment malfunction or accident) affecting traffic flow into or out of the base cells, and such congestion is not reflected in a population of the parent cell or adjustment factors calculated for base cells, population of a base cell calculated based on the population of the parent cell and an adjustment factor may be increased or decreased, as necessary to reflect the actual or predicted conditions of the base cell. Alternatively, however, the base cells need not be augmented, and populations for the base cells may be determined by multiplying portions of the population of the parent cell by the respective adjustment factors calculated for the accessible or populated base cells alone.

At box 360, population densities are calculated for the accessible or populated base cells, e.g., by dividing the populations calculated for the respective base cells by the area or the size of the respective base cells.

At box 365, base cells having equal or substantially similar population densities are aggregated into child cells. For example, where multiple adjacent or proximate base cells have populations allocated thereto that are equal or substantially similar to one another, the base cells may be treated collectively as a common cell, e.g., a child cell, within a population density map. Alternatively, the base cells need not be aggregated into child cells.

At box 370, a population density map is generated based on the child cells, as well as the inaccessible or unpopulated base cells. The population density map identifies portions of the parent cell having equal or substantially similar populations, e.g., defined by the child cells, as well as portions of the parent cell having zero populations, e.g., defined by the inaccessible or unpopulated base cells. The population density map may further include adjusted population density values of the respective base cells, or indicators of their respective adjusted population density values, in their corresponding locations within the parent cell. Alternatively, or additionally, the population map may indicate individual base cells that are accessible or populated, along with one or more child cells, and one or more inaccessible or unpopulated base cells. Routes or paths within the parent cell may be determined based on the child cells within the population density map, as well as any accessible or populated base cells, or inaccessible or unpopulated base cells. In some embodiments, however, child cells need not be formed from base cells in order to generate a population density map. In such embodiments, the population density map may include accessible or populated base cells, or inaccessible or unpopulated base cells.

At box 375, a route for travel through the region is selected based at least in part on the population density map, and the process ends. For example, where a mission requiring travel by an aerial vehicle from an origin within the region to a destination within the region is identified, a route for performing the mission having one or more paths is selected based at least in part on the population density map, e.g., to maximize a level of reliability of the route, to minimize a level of unreliability for the route, or in any other manner or on any other basis. In some embodiments, a route or a path may be selected according to a search algorithm, e.g., an A* search algorithm, or any other route or path planning algorithm. Alternatively, the route or the path may be selected to specifically travel over specific base cells, or to specifically avoid specific base cells, that are identified or selected based on the population density map.

As is discussed above, population may be allocated to accessible or populated base cells within a geographic region based on their respective classifications, which may themselves be determined based on any structures, functions or activities that are located or occurring therein. One example in which a parent cell is divided into two classes of accessible or populated base cells is shown in FIGS. 4A through 4C.

Figure 4A:
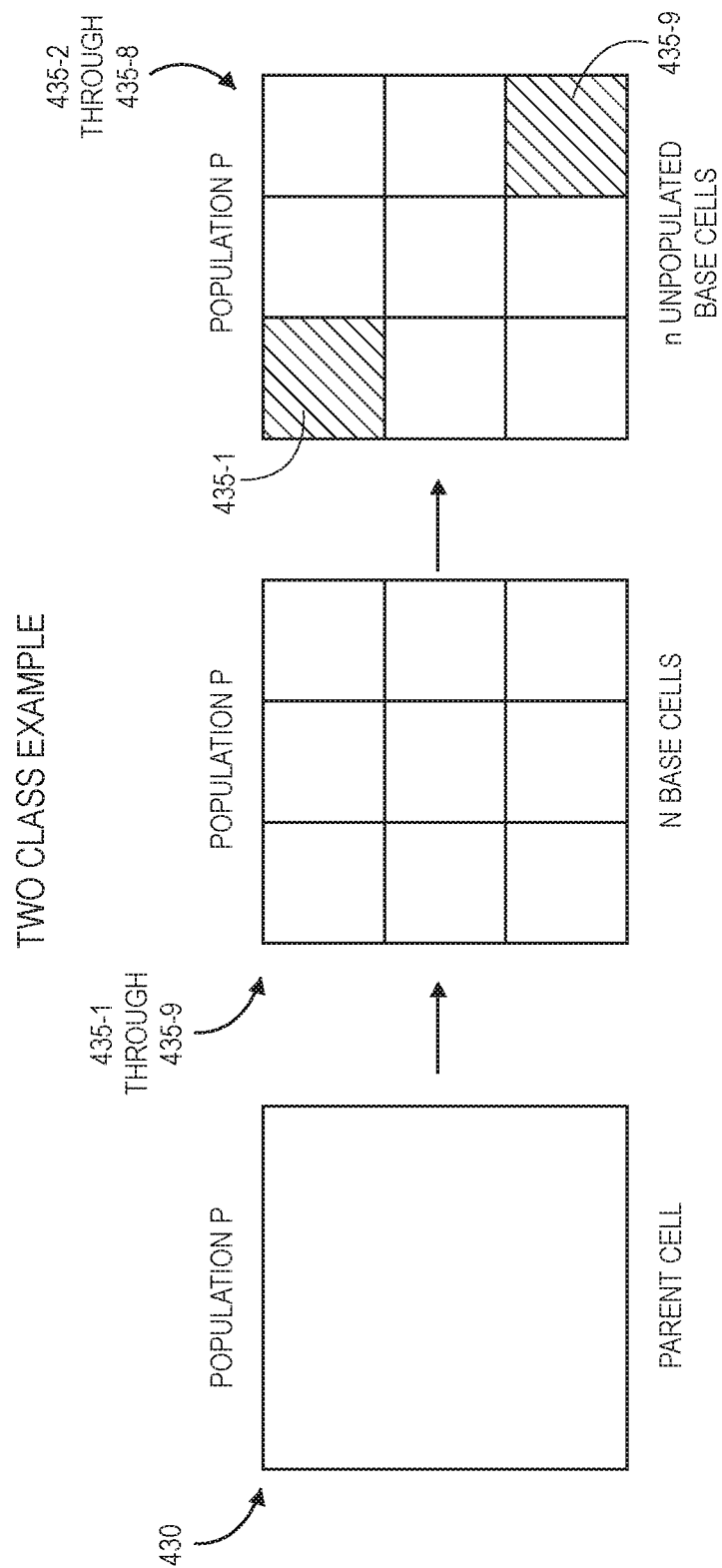
Figure 4B:
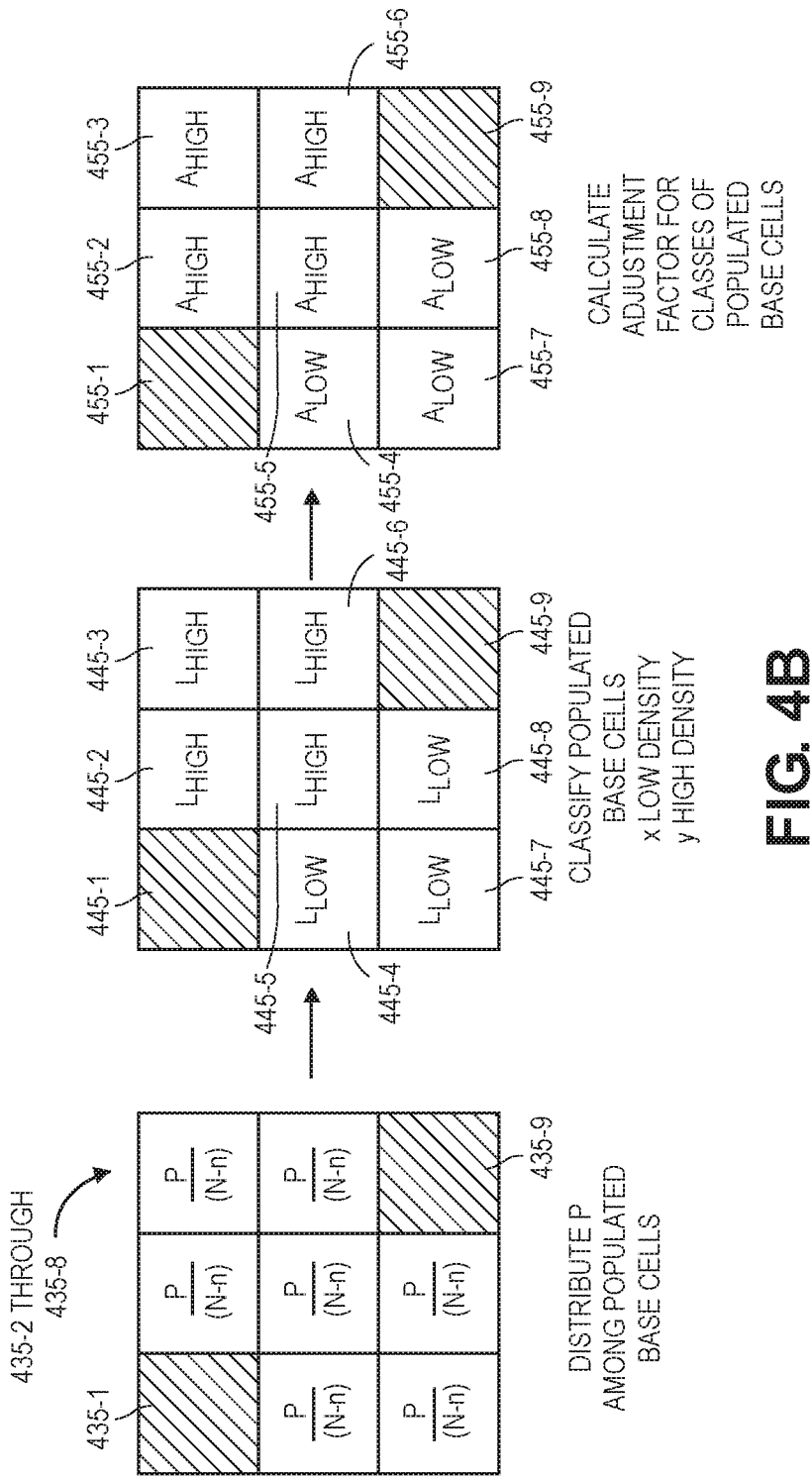

Referring to FIGS. 4A through 4C, views of aspects of one system for predicting localized population densities in accordance with embodiments of the present disclosure are shown. Except where otherwise noted, reference numerals preceded by the number "4" shown in FIGS. 4A through 4C indicate components or features that are similar to components or features having reference numerals preceded by the number "2" shown in FIG. 2 or by the number "1" shown in FIGS. 1A through 1H.

As is shown in FIG. 4A, a parent cell 430 has a population P. The parent cell 430 may be a geographic map of a region, or a portion of a geographic map of a region, having any area or size, and any shape, e.g., a square. The parent cell 430 may be divided into base cells 435-1 through 435-9, viz., where N=9, which may have any size or area with respect to the size or area of the parent cell 430, and any shape, e.g., the same shape as the parent cell 430.

As is also shown in FIG. 4A, n base cells 435-1, 435-9, where n=2, are identified as inaccessible or unpopulated, and the remainder of the base cells 435-2 through 435-8 are identified as accessible or populated. For example, the base cells 435-1, 435-9 may be identified as inaccessible or unpopulated, or the base cells 435-2 through 435-8 may be identified as accessible or populated, based on metadata associated with the geographic map or other data regarding the region, including but not limited to the base cells 435-1 through 435-9.

As is shown in FIG. 4B, the population P of the parent cell 430 is distributed among the base cells 435-2 through 435-8 that are identified as accessible or populated. For example, because n of the N base cells 435-1 through 435-9 have been identified as accessible or populated, the population P may be evenly assigned to the base cells 435-2 through 435-8 that have been identified as accessible or populated, e.g., by distributing P/(N−n), or P/7, to each of the base cells 435-2 through 435-8.

Additionally, as is also shown in FIG. 4B, classifications 445-2 through 445-8 may be determined for each of the accessible or populated base cells 435-2 through 435-8 based on ground features or other attributes of the portions of the parent cell 430 corresponding to such base cells 435-2 through 435-8, which may identify one or more structures, functions or activities that are located or occurring within the base cells 435-2 through 435-8. Any number of classifications may be identified for the accessible or populated base cells 435-2 through 435-8.

For example, as is shown in FIG. 4B, two classes of the accessible or populated base cells 435-2 through 435-8 are identified, e.g., low population densities, and high population densities. Where x (viz., 3) of the accessible or populated base cells 435-2 through 435-8 are determined to have low population densities, a classification of $L_{LOW}$ may be assigned to each of the x base cells. Where y (viz., 4) of the accessible or populated base cells 435-2 through 435-8 are determined to have high population densities, a classification of $L_{HIGH}$ may be assigned to each of they base cells, such that a sum of x and y is equal to the number of the accessible or populated base cells 435-2 through 435-8, viz., x+y=(N−n). The classifications may specifically relate to population densities of base cells as of a given time, e.g., $L_{LOW}$ or $L_{HIGH}$, as well as one or more structures, functions or activities located or occurring within the base cells at the given time, or may have any arbitrary or meaningful labels, e.g., "$L_{SCHOOL}$," "$L_{FARM}$," $L_1$, $L_2$, $L_3$, $L_4$, $L_B$, $L_C$ and the like.

As is further shown in FIG. 4B, adjustment factors 455-2 through 455-8 may be calculated and assigned to the accessible or populated base cells 435-2 through 435-8. For example, an adjustment factor may be calculated for each of the classifications of the accessible or populated base cells 435-2 through 435-8, viz., an adjustment factor $A_{LOW}$ calculated for the x base cells having a classification $L_{LOW}$, and an adjustment factor $A_{HIGH}$ calculated for they base cells having a classification $L_{HIGH}$.

The adjustment factors 455-2 through 455-8 may be calculated in a manner that ensures that the entire population P will be allocated to the accessible or populated base cells 435-2 through 435-8. For example, as is shown in FIG. 4C, the population P of the parent cell 430 is allocated to the x base cells having the low population densities, or $x \cdot A_{LOW} \cdot P/(N-n)$, and to they base cells having the high population densities, or $y \cdot A_{HIGH} \cdot P/(N-n)$, but not to the base cells that are inaccessible or unpopulated, which are determined to have a population density of 0. Moreover, the adjustment factors 455-2 through 455-8 that are assigned to the base cells 435-2 through 435-8 may be calculated as functions of time. For example, a base cell classified with respect to a population density of that base cell at one time may be assigned an adjustment factor calculated for that base cell as of that time. Likewise, a base cell classified with respect to a population density of that base cell at a different time (e.g., a later or earlier time) may be assigned an adjustment factor calculated for that base cell as of that time, such as where a base cell may have different population densities at different times, on different days, or in different months or years. For example, because a base cell may have different population densities on different times of day, or days of a week or a month, or weeks or months of a year, different adjustment factors may be calculated for the base cell at such different times, on such different days, or in different weeks, months or years.

As is also shown in FIG. 4C, adjusting the population distributed to the low population density base cells and the high population density base cells in this manner ensures that the total population decrease in the x low population density base cells is equal to the total population increase in they high population density cells. For example, a difference between a population initially allocated to the x low population density base cells, or $x \cdot P/(N-n)$, and an adjusted low population density, or $x \cdot A_{LOW} \cdot P/(N-n)$, viz., the population transferred from the low population density cells, is equal to a difference between an adjusted high density population, or $y \cdot A_{HIGH} \cdot P/(N-n)$, and a population initially allocated to they high population density base cells, or $y \cdot P/(N-n)$, viz., the population transferred to the high population density cells.

As is also shown in FIG. 4C, adjustment factors $A_{LOW}$, $A_{HIGH}$ for the low population density cells and the high population density cells are dependent variables that may be calculated as functions of one another, as well as the numbers x, y of the low population density cells and high population density cells, respectively. The adjustment factor $A_{LOW}$ for the low population density cells is equal to one minus a quotient of the number y of high population density cells divided by the number x of low population density cells, or y/x, multiplied by a difference between the adjustment factor $A_{HIGH}$ for the high population density cells and one, or ($A_{HIGH}-1$), and must have a positive value less than one. Similarly, the adjustment factor $A_{HIGH}$ for the high population density cells is equal to one plus a quotient of the number x of low population density cells divided by the number y of high population density cells, or x/y, multiplied by a difference between one and the adjustment factor $A_{LOW}$ for the low population density cells and one, or $(1-A_{HIGH})$, a nd must have a value greater than one.

Alternatively, in some embodiments, where a population of a base cell is known or believed to deviate from a population calculated based on a distributed portion of a population of a parent cell multiplied by an adjustment factor, the population may be augmented by adding population to or subtracting population from the base cell based on any information or data that may be known or predicted for a given base cell.

Figure 5:
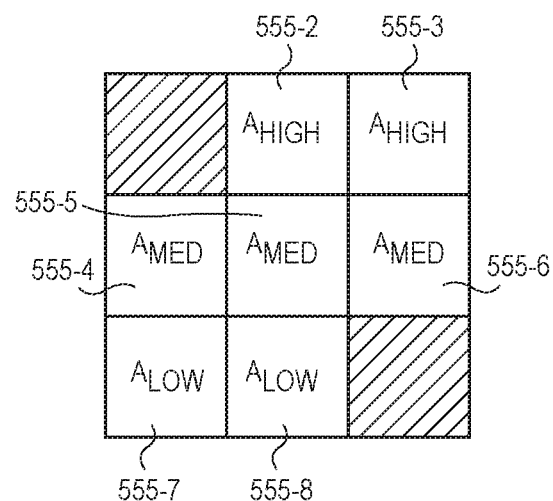
FIG. 5 is a view of aspects of one system for predicting localized population densities in accordance with embodiments of the present disclosure.

Another example in which a parent cell is divided into three classes of accessible or populated base cells is shown in FIG. 5. Referring to FIG. 5, views of aspects of one system for predicting localized population densities in accordance with embodiments of the present disclosure are shown. Except where otherwise noted, reference numerals preceded by the number "5" shown in FIG. 5 indicate components or features that are similar to components or features having reference numerals preceded by the number "4" shown in FIGS. 4A through 4C, by the number "2" shown in FIG. 2 or by the number "1" shown in FIGS. 1A through 1H.

As is shown in FIG. 5, three classifications $L_{LOW}$, $L_{MED}$, $L_{HIGH}$ of accessible or populated base cells are identified, e.g., low population densities, medium population densities, and high population densities. Where x (viz., 2) of the accessible or populated base cells 535-2 through 535-8 are determined to have low population densities, a classification of $L_{LOW}$ may be assigned to the x base cells. Where y (viz., 3) of the accessible or populated base cells 535-2 through 535-8 are determined to have medium population densities, a classification of $L_{MED}$ may be assigned to they base cells. Where z (viz., 2) of the accessible or populated base cells 535-2 through 535-8 are determined to have high population densities, a classification of $L_{HIGH}$ may be assigned to they base cells, such that a sum of x, y and z is equal to the number of the accessible or populated base cells 535-2 through 535-8, viz., $x+y+z=(N-n)$.

As is further shown in FIG. 5, adjustment factors 555-2 through 555-8 may be calculated and assigned to the accessible or populated base cells as functions of one another, and also of x, y and z, in such a manner that the entire population P of the parent cell is assigned to the accessible or populated base cells. For example, in one embodiment, an adjustment factor AMED having a value of one may be assigned to they base cells having the classification $L_{MED}$, while an adjustment factor $A_{LOW}$ having a value less than one may be calculated for the x base cells having the classification $L_{LOW}$, and an adjustment factor $A_{HIGH}$ having a value greater than one may be calculated for the z base cells having the classification $L_{HIGH.}$ The population $P/(N-n)$ initially assigned to each of the base cells having the classifications $L_{LOW}$, $L_{MED}$, $L_{HIGH}$ may be multiplied by their corresponding adjustment factors $A_{LOW}$, $A_{MED}$, $A_{HIGH}$, in order to calculate populations for each of such base cells, which may be used in calculating population densities for such base cells, and generating a population density map. Alternatively, the adjustment factors $A_{LOW}$, $A_{MED}$, $A_{HIGH}$ may have any value greater than zero and either greater than, equal to or less than one in accordance with embodiments of the present disclosure.

Figure 6:
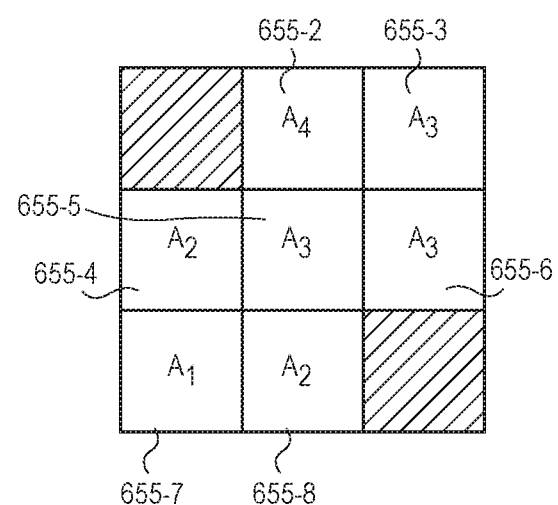
FIG. 6 is a view of aspects of one system for predicting localized population densities in accordance with embodiments of the present disclosure.

Another example in which a parent cell is divided into four classes of accessible or populated base cells is shown in FIG. 6. Referring to FIG. 6, views of aspects of one system for predicting localized population densities in accordance with embodiments of the present disclosure are shown. Except where otherwise noted, reference numerals preceded by the number "6" shown in FIG. 6 indicate components or features that are similar to components or features having reference numerals preceded by the number "5" shown in FIG. 5, by the number "4" shown in FIGS. 4A through 4C, by the number "2" shown in FIG. 2 or by the number "1" shown in FIGS. 1A through 1H.

As is shown in FIG. 6, four classifications $L_1$, $L_2$, $L_3$, $L_4$ of accessible or populated base cells are identified, e.g., low population densities, medium population densities, and high population densities. In particular, x (viz., 1) of the accessible or populated base cells 635-2 through 635-8 are assigned the classification of $L_1$, y (viz., 2) of the accessible or populated base cells 635-2 through 635-8 are assigned the classification of $L_2$, z (viz., 3) of the accessible or populated base cells 635-2 through 635-8 are assigned the classification of $L_3$, and a (viz., 1) of the accessible or populated base cells 635-2 through 635-8 are assigned the classification of $L_4$, such that a sum of x, y, z and a is equal to the number of the accessible or populated base cells 635-2 through 635-8, viz., $x+y+z+a=(N-n)$.

As is further shown in FIG. 6, adjustment factors 655-2 through 655-8 may be calculated and assigned to the accessible or populated base cells. For example, in one embodiment, an adjustment factor $A_1$ may be calculated for the x base cells having the classification $L_1$, while an adjustment factor $A_2$ may be calculated for they base cells having the classification $L_2$, an adjustment factor $A_3$ may be calculated for the z base cells having the classification $L_3$ and an adjustment factor $A_4$ may be calculated for the a base cells having the classification $L_4$. The population $P/(N-n)$ initially assigned to each of the base cells having the classifications $L_1$, $L_2$, $L_3$, $L_4$ may be multiplied by their corresponding adjustment factors $A_1$, $A_2$, $A_3$, $A_4$, in order to calculate populations for each of such base cells, which may be used in calculating population densities for such base cells, and generating a population density map. The adjustment factors $A_1$, $A_2$, $A_3$, $A_4$ may be calculated in such a manner that the entire population P of the parent cell is assigned to the accessible or populated base cells.

Figure 7:
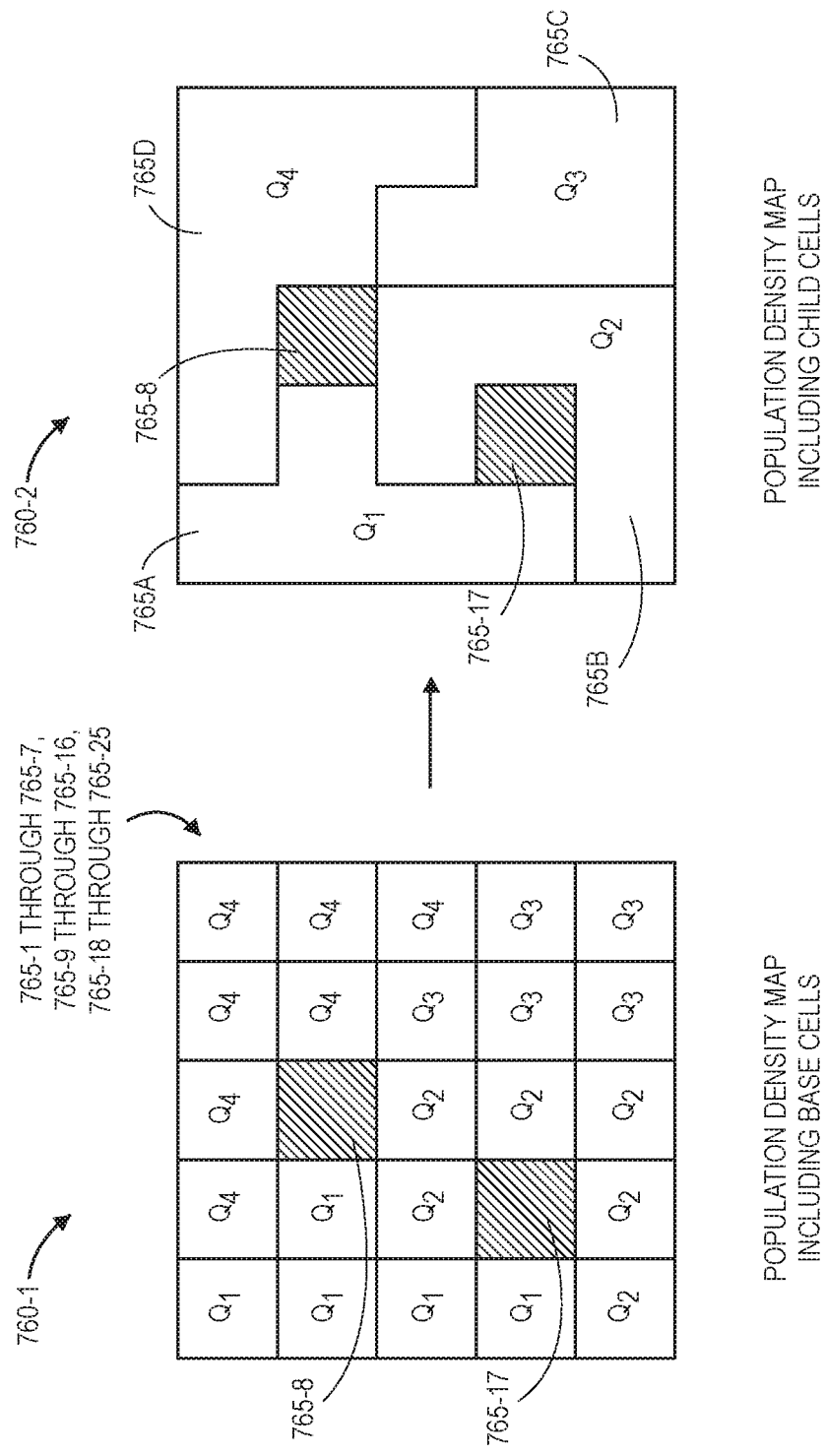
FIG. 7 is a view of aspects of one system for predicting localized population densities in accordance with embodiments of the present disclosure.

As is discussed above, base cells that are adjacent to one another and have equal or substantially similar population densities may be aggregated into child cells and considered together when generating a population density map. Referring to FIG. 7, views of aspects of one system for predicting localized population densities in accordance with embodiments of the present disclosure are shown. Except where otherwise noted, reference numerals preceded by the number "7" shown in FIG. 7 indicate components or features that are similar to components or features having reference numerals preceded by the number "6" shown in FIG. 6, by the number "5" shown in FIG. 5, by the number "4" shown in FIGS. 4A through 4C, by the number "2" shown in FIG. 2 or by the number "1" shown in FIGS. 1A through 1H.

As is shown in FIG. 7, a population map 760-1 has a plurality of positive population density values 765-1 through 765-7, 765-9 through 765-16, 765-18 through 765-25 for accessible or populated base cells, or $Q_1$, $Q_2$, $Q_3$, $Q_4$, and a pair of population density values 765-8, 765-17 for inaccessible or unpopulated base cells that are zero. In some embodiments, routes or paths may be determined throughout a parent cell from which the population map 760-1 was generated based on the locations of the respective positive population density values 765-1 through 765-7, 765-9 through 765-16, 765-18 through 765-25 and the locations of the zero population density values 765-8, 765-17.

Alternatively, as is also shown in FIG. 7, adjacent base cells having equal or similar population density values may be aggregated into child cells, and a population map 760-2 may be formed based on the population density values of the child cells and any base cells having zero population density values. For example, a child cell 765A may be formed from adjacent base cells having a population density value $Q_1$, while a child cell 765B may be formed from adjacent base cells having a population density value $Q_2$, a child cell 765C may be formed from adjacent base cells having a population density value $Q_3$, and a child cell 765D may be formed from adjacent base cells having a population density value $Q_4$. A population density map may also be generated based on the locations of the child cells 765A, 765B, 756C, 765D and also the locations of the zero population density values 765-8, 765-17.

Figure 8:
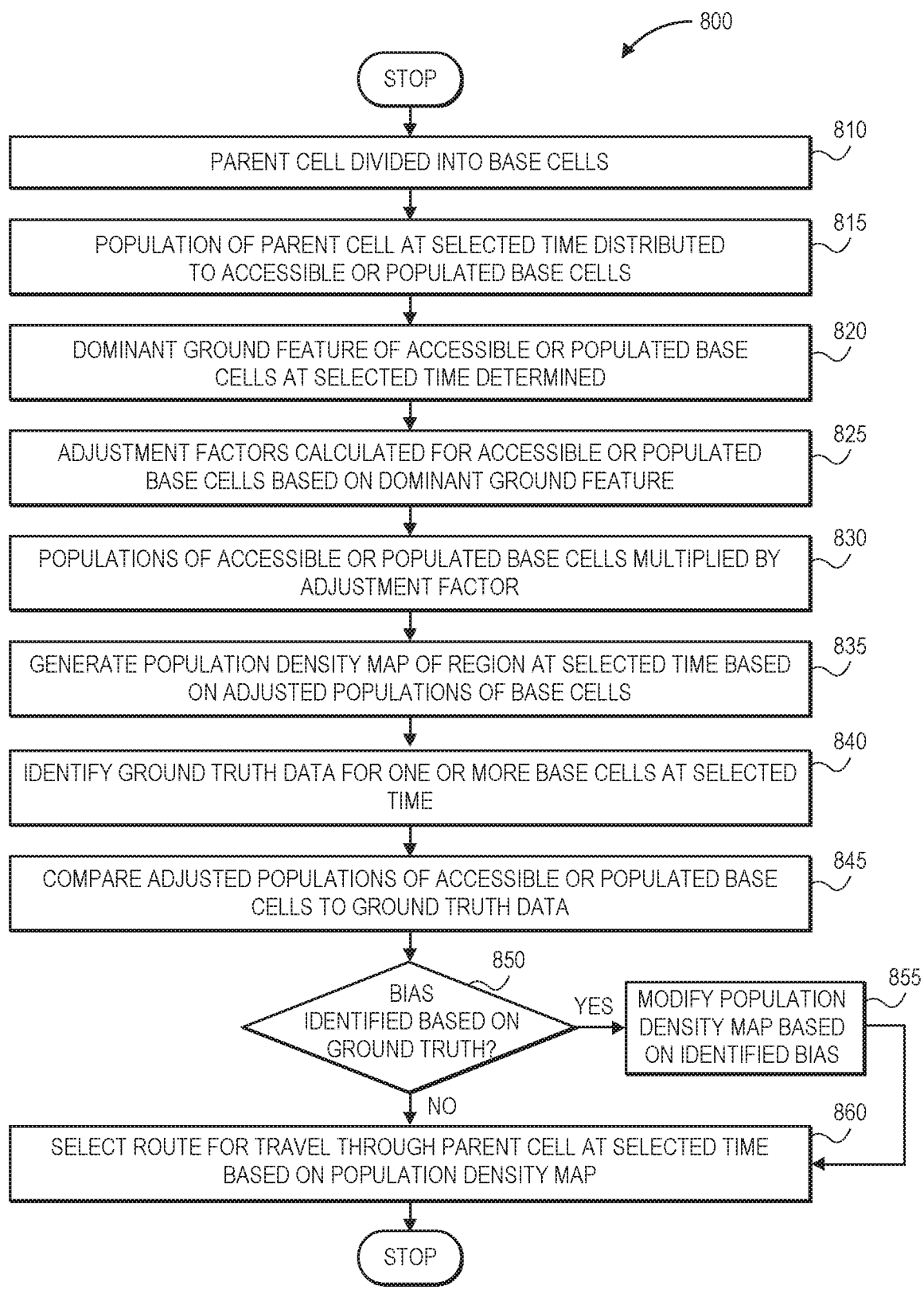
FIG. 8 is a flow chart of one process for predicting localized population densities in accordance with embodiments of the present disclosure.

Referring to FIG. 8, a flow chart 800 of one process for predicting localized population densities in accordance with embodiments of the present disclosure is shown.

At box 810, a parent cell is divided into a plurality of base cells, and at box 815, a population of the parent cell at a selected time is distributed to accessible or populated base cells of the parent cell. The parent cell and the base cells may have any areas or sizes, e.g., a square parent cell having a size or area of one square kilometer, or any number of square base cells having dimensions of two hundred fifty meters by two hundred fifty meters (250 m×250 m), or any shapes, e.g., not only squares but also triangles, rectangles, pentagons, hexagons, octagons, or others.

At box 820, one or more dominant ground features of the populated base cells at the selected time are determined. For example, the ground features may be identified based on GIS data, digital elevation model data, digital terrain model data, orthoimages (or orthophotos), or others, which may be processed to identify one or more features within the base cells, or to determine which of such features most predominantly represents the base cells as a whole at the selected time.

At box 825, adjustment factors are calculated for the accessible or populated based cells based on the dominant ground features at the selected time. For example, the adjustment factors may be calculated with positive values that are less than one, equal to one, or greater than one, such that when each of the adjustment factors is multiplied by a population of the parent cell that has been allocated to a corresponding base cell at the selected time, in order to decrease, maintain or increase the population that has been allocated to the base cell accordingly, in a manner that conserves the total population of the parent cell.

At box 830, the populations of the accessible or populated base cells are multiplied by their respective adjustment factors. For example, where a population of an accessible or populated base cell has been calculated by determining the population of the parent cell at box 815, identifying a number of inaccessible or unpopulated base cells, and allocating the population of the parent cell among the accessible or populated base cells, e.g., in a proportional or pro rata manner, adjusted populations of each of the base cells may be calculated by multiplying the allocated portion of the population of the parent cell by adjustment factors calculated for the respective base cells at box 825, in a manner that ensures that the entire population of the parent cell determined at box 815 is allocated among the base cells that have been determined to be accessible or populated.

At box 835, a population density map of the region at the selected time is generated based at least in part on the populations of the accessible or populated base cells, as adjusted at box 830. For example, the population density map may include base cells that are accessible or populated, and for which adjusted populations are calculated at box 835, and their respective adjusted population values, or indicators of their respective adjusted population values, in their corresponding locations within the parent cell. Alternatively, the adjusted populations calculated for one or more base cells at box 835 may be augmented, e.g., by adding or subtracting population, prior to calculating the population densities of the respective base cells.

Additionally, in some embodiments, one or more child cells may be formed by aggregating base cells having the same or proximate populations, as adjusted by their respective adjustment factors. The population density map may include or depict one or more child cells, along with one or more inaccessible or unpopulated cells. In some embodiments, child cells may be formed for each of the base cells that are accessible or populated, and for which adjusted populations are calculated at box 835. In some other embodiments, a population density map may include child cells formed from one or more of such base cells, along with one or more other base cells that are accessible or populated, and for which adjusted populations are calculated at box 835.

At box 840, ground truth data, e.g., actual population levels, for one or more of the base cells at the selected time is identified. For example, the ground truth data may relate to an actual population level in the parent cell, or in any of the base cells, or to actual ground features within such cells. In some embodiments, the ground truth data may be identified based at least in part on a survey of the population within one or more base cells, which may be performed at or near the selected time. Alternatively, in some embodiments, the survey may be performed after one or more missions have been performed by aerial vehicles traveling through the region via routes or paths selected based at least in part on the population density map generated at box 835.

At box 845, the adjusted populations of the accessible or populated base cells is compared to the ground truth data. For example, where the ground truth data identifies an actual population of a neighborhood, a village, a school or a hospital within one or more of the base cells, or actual events or activities occurring within one or more of the base cells, the actual population, or the actual events or activities, may be compared to the populations of the accessible or populated base cells, as adjusted by the adjustment factors at box 830, or to the events or activities for which the adjustment factors were calculated. One or more adjustment factors calculated for such base cells, and for any other base cells, may be modified accordingly.

At box 850, whether any bias is identified based on the ground truth data is determined. For example, differences between the ground truth data for a given base cell and any populations or features of that base cell may be compared to one or more predetermined thresholds or limits, and to the extent that such differences exceed one or more of the thresholds or limits, bias may be identified for the base cell.

If any bias is identified based on the ground truth data, the process advances to box 855, where the population density map is modified to account for the identified bias. For example, where the bias indicates that a population calculated for a base cell is higher than the actual population of that base cell, an adjustment factor for that base cell may be decreased, and one or more adjustment factors of other base cells may be increased accordingly, such that portions of the population of the parent cell that have been allocated to the base cell may be allocates to other base cells. Where the bias indicates that a population calculated for a base cell is lower than the actual population of that base cell, an adjustment factor for that base cell may be increased, and one or more adjustment factors of other base cells may be decreased accordingly, such that portions of the population of the parent cell that have been allocated to other base cells may be allocated to that base cell.

If no bias has been identified, or after the population density map has been modified to account for any identified bias, the process advances to box 860, where a route for travel through the region is selected based at least in part on the population density map, and the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the pertinent arts will recognize that localized population densities may be predicted based on any type or form of data that is intrinsic to a geospatial area or geographic region, and are not limited to specific features within such regions. For example, in some embodiments, a number or a density of animals other than humans (e.g., endangered species), valuable objects (e.g., expensive or rare automobiles), physical features (e.g., mountains, trees, valleys) or other things may be considered in predicting one or more localized population densities. Information or data regarding geographic regions, cells, ground features, populations or other aspects may be obtained from any source in accordance with embodiments of the present disclosure.

Moreover, population maps or population density maps that are generated in accordance with embodiments of the present disclosure may be utilized in any application in which a route or path travel over, around or through a region is to be determined based on population densities, and need not be limited to any specific application disclosed herein. The systems and methods of the present disclosure may be utilized in connection with travel by any type or form of vehicle, and are not limited for use by aerial vehicles (e.g., manned or unmanned) in general, or unmanned aerial vehicles in particular. The terms "population map" and "population density map" may be used synonymously or interchangeably herein, such that a population map may include representations of or references to population densities in a parent cell, or in one or more base cells or child cells formed from the parent cell, while a population density map may include representations of or references to populations in a parent cell, or in one or more base cells or child cells formed from the parent cell.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. In particular, the one or more of the models of exposure to noise are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
 at least one aerial vehicle;
 a computer connected to a network, wherein the computer is in communication with the at least one aerial vehicle, wherein the computer is programmed with one or more instructions that, when executed, cause the computer to at least:
identify a geographic map of a region, wherein the region is a parent cell having dimensions of at least one kilometer by one kilometer, and a shape of a square;
identify a population of the region at a selected time;
divide the geographic map into a plurality of cells, wherein each of the cells has a common area having dimensions of not greater than fifty meters by fifty meters, and a shape of a square;
determine that at least one of the plurality of cells is substantially unpopulated;
allocate portions of the population of the region to each of a subset of the plurality of the cells, wherein the subset of cells does not include the at least one cell that is substantially unpopulated;
identify a ground feature of each of the cells of the subset;
determine, for each of the cells of the subset, an adjustment factor based at least in part on the ground feature of each of the cells of the subset;
calculate a population density for each of the cells of the subset, wherein the population density is calculated based at least in part on the portions of the population of the region allocated to each of the cells of the subset, the adjustment factors determined for each of the cells of the subset, and the common area of the cells;
generate a population density map for the region based at least in part on the population densities for each of the cells of the subset;
identify information regarding a mission requiring travel from a first location within a portion of the region corresponding to one of the plurality of cells and a portion of the region corresponding to another one of the plurality of cells;
select a route for the at least one aerial vehicle based at least in part on the population density map generated for the region based at least in part on the population densities for each of the cells of the subset; and
program the at least one aerial vehicle with at least one of the route or the population density map.

2. The system of claim 1, wherein the one or more instructions, when executed by the computer, further cause the computer to at least:
determine a first classification based at least in part on a ground feature of at least one of a first number of the cells of the subset;
assign the first classification to the first number of the cells of the subset;
determine a second classification based at least in part on a ground feature of at least one of a second number of the cells of the subset; and
assign the second classification to the second number of the cells of the subset,
wherein a first adjustment factor having a positive value greater than one is determined for each of the first number of the cells of the subset based at least in part on the first classification, and
wherein a second adjustment factor having a positive value between zero and one is determined for each of the second number of the cells of the subset based at least in part on the second classification.

3. The system of claim 1, wherein the one or more instructions, when executed by the computer, further cause the computer to at least:
determine that the at least one of the plurality of cells is predominantly water,
wherein that the at least one of the plurality of cells is substantially unpopulated is determined in response to determining that the at least one of the plurality of cells is predominantly water.

4. The system of claim 1, wherein each of the ground features is one of:
a body of water;
a commercial institution;
an educational institution;
a farm;
a medical facility;
a multi-family dwelling; or
a single-family dwelling.

5. A method comprising:
retrieving, by at least one computer system, a geographic map of a region, wherein the region is a parent cell having dimensions of at least one kilometer by one kilometer, and a shape of a square;
determining a population of the region at a first time;
dividing, by the at least one computer system, at least a portion of the geographic map into a plurality of cells, wherein each of the plurality of cells has a common area having dimensions of not greater than fifty meters by fifty meters, and a shape of a square;
allocating, by the at least one computer system, a portion of the population of the region at the first time to each of a subset of the cells, wherein the subset of the cells does not include at least one of the plurality of cells;
determining, by the at least one computer system for at least a first cell of the subset of the cells, a first adjustment factor for the first cell at the first time based at least in part on a first ground feature within the first cell;
determining, by the at least one computer system for at least a second cell of the subset of the cells, a second adjustment factor for the second cell at the first time based at least in part on a second ground feature within the second cell;
calculating, by the at least one computer system, a first population density of the first cell at the first time based at least in part on the first adjustment factor and the portion of the population of the region at the first time allocated to the first cell;
calculating, by the at least one computer system, a second population density of the second cell at the first time based at least in part on the second adjustment factor and the portion of the population of the region at the first time allocated to the second cell; and
generating, by the at least one computer system, a first population density map of the region, wherein the first population density map identifies the first population density of the first cell and the second population density of the second cell.

6. The method of claim 5, wherein the first cell is one of a first number of the subset of the cells,
wherein the second cell is one of a second number of the subset of cells,
wherein the first adjustment factor has a positive value greater than one,
wherein the second adjustment factor is determined based at least in part on the first number, the second number and the first adjustment factor, and wherein the second adjustment factor has a positive value between zero and one.

7. The method of claim 6, further comprising:
determining, by the at least one computer system for at least a third cell of the subset of the cells, a third adjustment factor for the third cell at the first time based at least in part on a third ground feature within the third cell; and
calculating, by the at least one computer system, a third population density of the third cell at the first time based at least in part on the third adjustment factor and the portion of the population allocated to the third cell,
wherein the first population density map identifies the first population density of the first cell, the second population density of the second cell and the third population density of the third cell.

8. The method of claim 6, wherein the region is a parent cell, and
wherein the method further comprises:
generating a first child cell based at least in part on at least some of the first number of the subset of the cells; and
generating a second child cell based at least in part on at least some of the second number of the subset of the cells,
wherein the first population density map comprises the first child cell and the second child cell.

9. The method of claim 5, further comprising:
identifying, by the at least one computer system, a set of data regarding ground features within the region, wherein each of the ground features is one of a body of water, a commercial institution, an educational institution, a farm, a medical facility, a multi-family dwelling, or a single-family dwelling, and wherein the ground features include the first ground feature and the second ground feature;
classifying, by the at least one computer system, the first cell based at least in part on the first ground feature, wherein the first adjustment factor is determined in response to classifying the first cell; and
classifying, by the at least one computer system, the second cell based at least in part on the second ground feature, wherein the second adjustment factor is determined in response to classifying the second cell.

10. The method of claim 9, wherein the set of data comprises at least one of:
geographic information system data for at least a portion of the region, wherein the portion of the region comprises the first cell and the second cell;
digital elevation model data for at least the portion of the region;
digital terrain model data for at least the portion of the region; or
at least one orthoimage of at least the portion of the region.

11. The method of claim 10, wherein the set of data comprises first data regarding the first ground feature and second data regarding a third ground feature within the first cell, and
wherein the method further comprises:
selecting, by the at least one computer system, the first ground feature based at least in part on the first data and the second data.

12. The method of claim 5, further comprising:
identifying an event occurring in the first cell at the first time; and determining, by the at least one computer system, a variation in population of the first cell at the first time associated with the event,
wherein the first population density is calculated based at least in part on the first adjustment factor, the portion of the population of the region at the first time allocated to the first cell, and the variation in population of the first cell at the first time associated with the event.

13. The method of claim 5, further comprising:
determining, by the at least one computer system, a population of the region at a second time;
allocating, by the at least one computer system, a portion of the population of the region at the second time to each of the subset of the cells;
determining, by the at least one computer system for at least the first cell, a third adjustment factor for the first cell at the second time based at least in part on the first ground feature;
determing by the at least one computer system for at least the second cell, a fourth adjustment factor for the second cell at the second time based at least in part on the second ground feature;
calculating, by the at least one computer system, a third population density of the first cell at the second time based at least in part on the third adjustment factor and the portion of the population of the region at the second time allocated to the first cell;
calculating, by the at least one computer system, a fourth population density of the second cell at the second time based at least in part on the fourth adjustment factor and the portion of the population of the region at the second time allocated to the second cell; and
generating, by the at least one computer system, a second population density map of the region at the second time, wherein the second population density map identifies the third population density of the first cell and the fourth population density of the second cell.

14. The method of claim 5, further comprising:
determining that the at least one of the plurality of cells is predominantly water.

15. The method of claim 5, further comprising:
generating, by the at least one computer system, a route for performing a mission by an aerial vehicle based at least in part on the first population density map, wherein at least one of an origin of the route, a destination of the route, or at least one path of the route passes over or is located in one of the first cell or the second cell;
selecting, by the at least one computer system, at least one of a course, a speed, or an altitude for traveling along the route or the at least one path based at least in part on the route or the first population density map; and
programming, by the at least one computer system, at least one of the course, the speed, the altitude or the first population density map into at least one memory storage component of the aerial vehicle.

16. The method of claim 5, further comprising:
determining, by the at least one computer system, a population of a portion of the region corresponding to the first cell;
calculating, by the at least one computer system, a third population density of the first cell based at least in part on the population determined for the portion of the region corresponding to the first cell and the common area of the cells;
determing, by the at least one computer system, that the third population density of the first cell deviates from the first population density of the first cell by at least a predetermined threshold; and in response to determining that the third population density of the first cell deviates from the first population density of the first cell by at least a predetermined threshold, modifying, by the at least one computer system, at least one of the first adjustment factor or the second adjustment factor.

17. An aerial vehicle comprising:

at least one propulsion motor; and a control system having at least one computer processor, wherein the control system is in communication with the at least one propulsion motor, wherein the control system is programmed with one or more sets of instructions that, when executed by the at least one computer processor, cause the aerial vehicle to at least:

receive data comprising a geographic map of a region and a population of the region, wherein the region is a parent cell having dimensions of at least one kilometer by one kilometer, and a shape of a square;

divide at least a portion of the geographic map into a plurality of cells, wherein each of the plurality of cells has a common area having dimensions of not greater than fifty meters by fifty meters, and a shape of a square;

allocate a portion of the population of the region to each of a subset of the plurality of the cells, wherein the subset of the plurality of cells does not include at least one of the plurality of cells;

determine, for at least a first cell of the subset of the plurality of cells, a first adjustment factor based at least in part on at least a first building within the first cell;

determine, for at least a second cell of the subset of the plurality of cells, a second adjustment factor based at least in part on a second building within the second cell;

calculate a first population density of the first cell based at least in part on the first adjustment factor and the portion of the population allocated to the first cell;

calculate a second population density of the second cell based at least in part on the second adjustment factor and the portion of the population allocated to the second cell;

generate a population density map of the region, wherein the population density map comprises the first population density of the first cell and the second population density of the second cell;

determine a route for performing a mission by the aerial vehicle based at least in part on the population density map; and select at least one of a course, a speed, or an altitude for traveling along the route or at least one path of the route based at least in part on the route or the population density map.

18. The aerial vehicle of claim 17, wherein the data comprises at least one of:

geographic information system data for at least a portion of the region, wherein the portion of the region comprises the first cell and the second cell;

digital elevation model data for at least the portion of the region;

digital terrain model data for at least the portion of the region; or at least one orthoimage of at least the portion of the region.

19. The aerial vehicle of claim 17, wherein the first building is a first one of:

a commercial institution;

an educational institution;

a farm;

a medical facility;

a multi-family dwelling; or a single-family dwelling;

wherein the second building is a second one of:

a commercial institution;

an educational institution;

a farm;

a medical facility;

a multi-family dwelling; or a single-family dwelling.

\* \* \* \* \*